(12) United States Patent
Cho et al.

(10) Patent No.: US 9,594,187 B2
(45) Date of Patent: Mar. 14, 2017

(54) MATERIAL FOR OPTICAL FILM, POLYMER, ARTICLE PREPARED BY USING THE POLYMER, AND DISPLAY DEVICE INCLUDING THE ARTICLE

(71) Applicant: SAMSUNG ELECTRONICS CO., LTD., Suwon-si, Gyeonggi-do (KR)

(72) Inventors: Chung Kun Cho, Suwon-si (KR); Androsov Dmitry, Suwon-si (KR); Kalinina Fedosya, Hwaseong-si (KR); Yoon Seok Ko, Seoul (KR); Kovalev Mikhail, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 622 days.

(21) Appl. No.: 13/789,218

(22) Filed: Mar. 7, 2013

(65) Prior Publication Data

US 2013/0303691 A1  Nov. 14, 2013

(30) Foreign Application Priority Data

May 9, 2012  (KR) ........................ 10-2012-0049314

(51) Int. Cl.
*G02B 1/04* (2006.01)
*G02B 1/00* (2006.01)
*C08G 73/14* (2006.01)
*G02B 1/10* (2015.01)

(52) U.S. Cl.
CPC ............... *G02B 1/04* (2013.01); *C08G 73/14* (2013.01); *G02B 1/10* (2013.01)

(58) Field of Classification Search
USPC ........................................ 528/289, 353, 391
See application file for complete search history.

(56) References Cited

U.S. PATENT DOCUMENTS

| | | | | |
|---|---|---|---|---|
| 3,696,077 A * | 10/1972 | Suzuki et al. | ......... | C08G 73/14 524/323 |
| 3,817,921 A * | 6/1974 | Brode et al. | ........... | C08G 73/14 524/600 |
| 5,155,206 A * | 10/1992 | Lubowitz | ............... | C08G 73/14 528/125 |
| 5,939,520 A * | 8/1999 | Langsam | ............. | B01D 53/228 210/500.38 |
| 6,001,942 A * | 12/1999 | Amako | .............. | C08G 73/1042 528/10 |
| 7,428,029 B2 * | 9/2008 | Murakami | ........... | G02B 5/3016 349/117 |

(Continued)

FOREIGN PATENT DOCUMENTS

| | | | |
|---|---|---|---|
| DE | 1962602 A1 | | 6/1971 |
| JP | 2000-026722 A | | 2/2000 |
| JP | 2005-306983 | * | 4/2005 |
| JP | 2005-306983 A | | 11/2005 |
| JP | 2010-106225 A | | 5/2010 |
| JP | 2013-28688 | * | 2/2013 |
| JP | 02013028688 A | * | 2/2013 |
| TW | 389776 B1 | | 5/2000 |
| WO | WO 2006/059825 | * | 6/2006 |

OTHER PUBLICATIONS

Jonquieres, A. et al., Synthesis and Characterization of New Highly Permeable Polyamideimides from Dianhydride Monomers Containing Amide Functions: An Application to the Purification of a Fuel Octane Enhancer (ETBE) by Pervaporation, Journal of Polymer Science, Part A: Polymer Chemistry 2000, 38: 614-630.

(Continued)

*Primary Examiner* — Tae H Yoon
(74) *Attorney, Agent, or Firm* — Cantor Colburn LLP

(57) ABSTRACT

A material for an optical film including a compound represented by Chemical Formula 1; a polymer including a repeating unit represented by Chemical Formula 10; a polymer including a repeating unit represented by Chemical Formula 20 and a repeating unit represented by Chemical Formula 21; an article prepared by using the polymer; and a display device including the article:

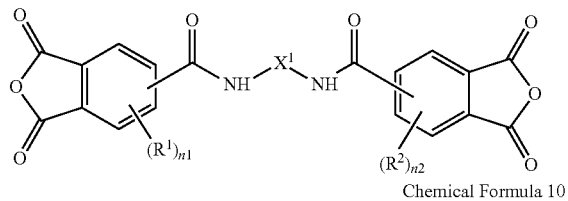

Chemical Formula 1

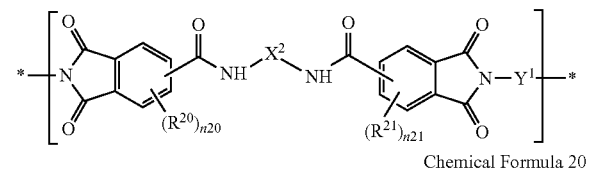

Chemical Formula 10

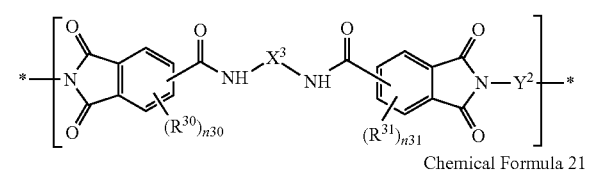

Chemical Formula 20

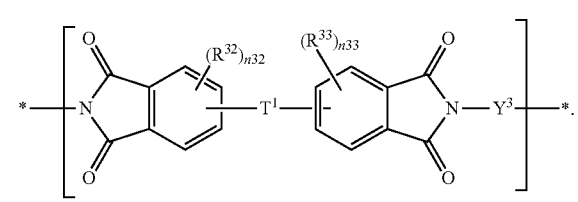

Chemical Formula 21

14 Claims, 4 Drawing Sheets

(56) References Cited

U.S. PATENT DOCUMENTS

2004/0138408 A1\* 7/2004 Harris .................... C08G 73/10
528/354
2009/0118460 A1\* 5/2009 Narain ............... C08G 73/1042
528/328

OTHER PUBLICATIONS

Mehdipour-Ataei et al., Poly(sulfone ether amide amide)s as a new generation of soluble, thermally stable polymers, European Polymer Journal, 2005, 41: 491-499.

\* cited by examiner

MATERIAL FOR OPTICAL FILM, POLYMER, ARTICLE PREPARED BY USING THE POLYMER, AND DISPLAY DEVICE INCLUDING THE ARTICLE

CROSS-REFERENCE TO RELATED APPLICATION

This application claims priority to and the benefit of Korean Patent Application No. 10-2012-0049314 filed on May 9, 2012, and all the benefits accruing therefrom under 35 U.S.C. §119, the content of which is incorporated herein in its entirety by reference.

BACKGROUND

1. Field

A novel material for an optical film, a polymer, an article prepared by using the polymer, and a display device including the article are disclosed.

2. Description of the Related Art

A colorless transparent material has been researched for diverse purposes such as for an optical lens, a functional optical film, and a disk substrate. As information devices are becoming smaller and display devices become capable of providing higher resolution, more functions and greater performance are required from the material.

Therefore, it would be desirable to develop a colorless transparent material having excellent transparency, heat resistance, mechanical strength, and flexibility.

SUMMARY

An embodiment provides a novel material for an optical film having improved transparency.

Another embodiment provides a polymer having improved transparency, heat resistance, mechanical strength, and flexibility.

Yet another embodiment provides an article prepared by using the polymer.

Still another embodiment provides a display device including the article.

According to an embodiment, a material for an optical film including a compound represented by the following Chemical Formula 1 is provided.

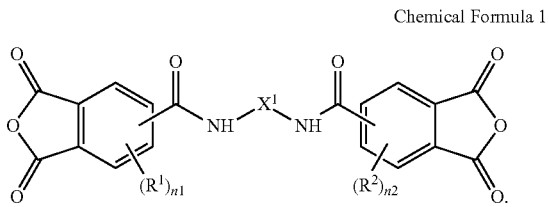

Chemical Formula 1

In Chemical Formula 1, $X^1$ is a functional group represented by Chemical Formulae 2 to 6, $R^1$ and $R^2$ are the same or different and are independently a halogen, a hydroxy group, ether group (—$OR^{200}$, wherein $R^{200}$ is a C1 to C10 aliphatic organic group), a silyl group (—$SiR^{201}R^{202}R^{203}$, wherein $R^{201}$, $R^{202}$, and $R^{203}$ are the same or different and are independently hydrogen, or a C1 to C10 aliphatic organic group), a substituted or unsubstituted C1 to C10 aliphatic organic group, or a C6 to C20 aromatic organic group, and n1 and n2 are each independently integers ranging from 0 to 3,

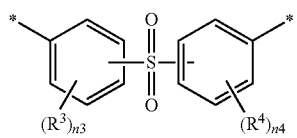

Chemical Formula 2

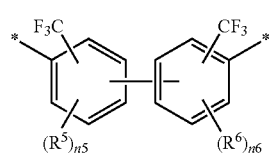

Chemical Formula 3

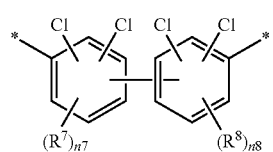

Chemical Formula 4

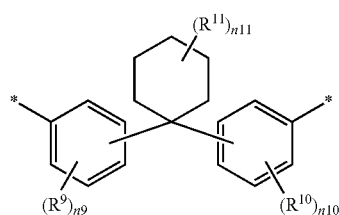

Chemical Formula 5

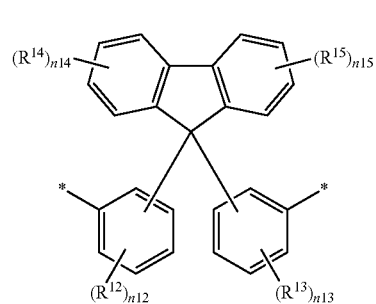

Chemical Formula 6

In Chemical Formulae 2 to 6, $R^3$ to $R^{15}$ are the same or different and are independently a halogen, a hydroxy group, an ether group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a C6 to C20 aromatic organic group, n3, n4, n9, n10, n12, n13, n14, and n15 are each independently integers ranging from 0 to 4, n5 and n6 are each independently integers ranging from 0 to 3, n7 and n8 are each independently integers ranging from 0 to 2, and n11 is an integer ranging from 0 to 10.

In an embodiment, in Chemical Formula 1, $X^1$ may be a functional group represented by Chemical Formulae:

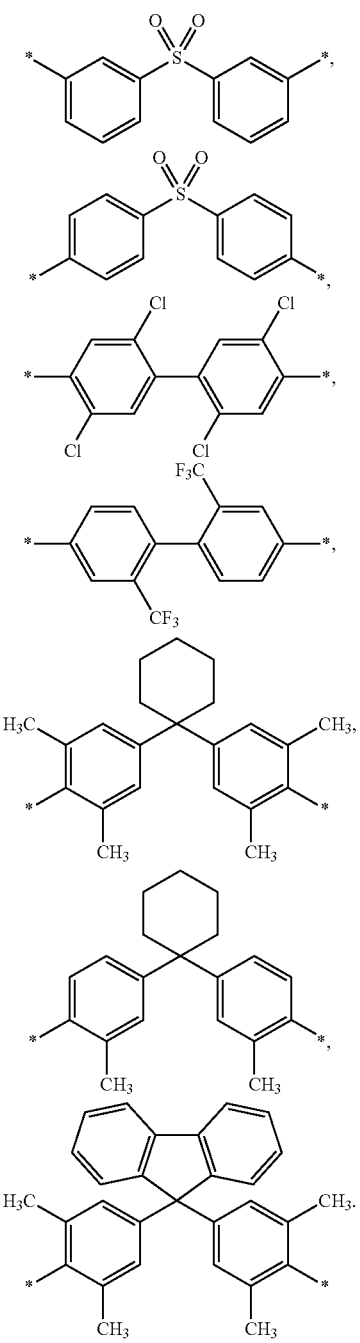

According to another embodiment, a polymer including a repeating unit represented by Chemical Formula 10 is provided.

Chemical Formula 10

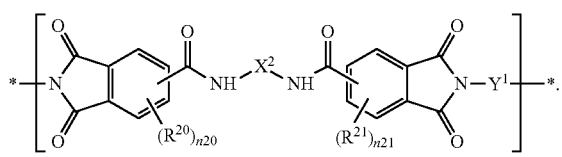

In Chemical Formula 10, $X^2$ is the same or different in each repeating unit and is independently a functional group represented by Chemical Formulae 2 to 6, $Y^1$ is the same or different in each repeating unit and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{20}$ and $R^{21}$ are the same or different, and are independently a halogen, a hydroxy group, an ether group (—OR$^{208}$, wherein $R^{208}$ is a C1 to C10 aliphatic organic group), a silyl group (—SiR$^{209}$R$^{210}$R$^{211}$, wherein $R^{209}$, $R^{210}$ and $R^{211}$ are the same or different and are independently hydrogen, or a C1 to C10 aliphatic organic group), a substituted or unsubstituted C1 to C10 aliphatic organic group, or a C6 to C20 aromatic organic group, and n20 and n21 are independently integers ranging from 0 to 3, Chemical Formula 2

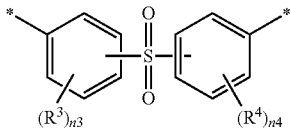

Chemical Formula 3

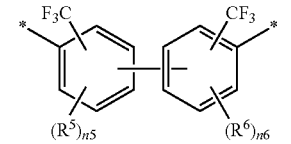

Chemical Formula 4

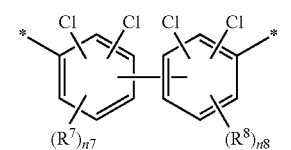

Chemical Formula 5

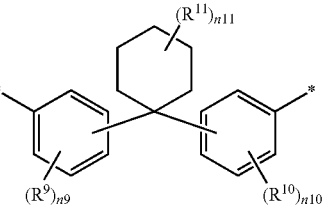

Chemical Formula 6

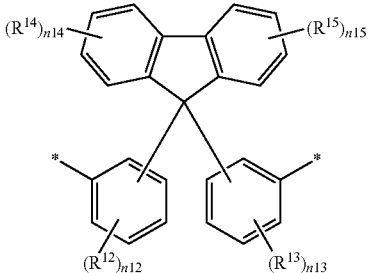

In Chemical Formulae 2 to 6, $R^3$ to $R^{15}$ are the same or different and are independently a halogen, a hydroxy group, an ether group (—$OR^{212}$, wherein $R^{212}$ is a C1 to C10 aliphatic organic group), a silyl group (—$SiR^{213}R^{214}R^{215}$, wherein $R^{213}$, $R^{214}$, and $R^{215}$ are the same or different and are independently hydrogen, or a C1 to C10 aliphatic organic group), a substituted or unsubstituted C1 to C10 aliphatic organic group, or a C6 to C20 aromatic organic group, n3, n4, n9, n10, n12, n13, n14, and n15 are each independently integers ranging from 0 to 4, n5 and n6 are each independently integers ranging from 0 to 3, n7 and n8 are each independently integers ranging from 0 to 2, and n11 is an integer ranging from 0 to 10.

In an embodiment, in Chemical Formula 10, $X^2$ may be a functional group represented by Chemical Formulae.

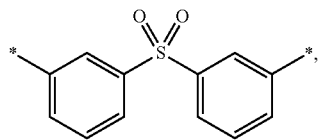

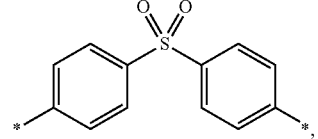

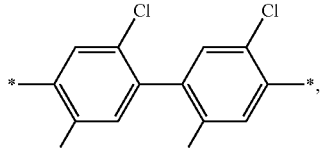

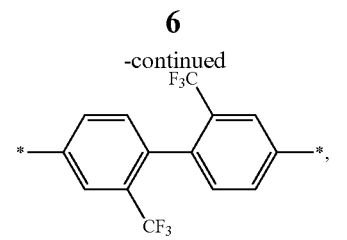

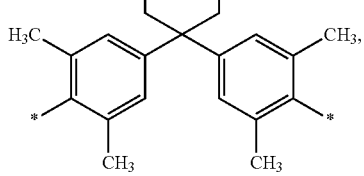

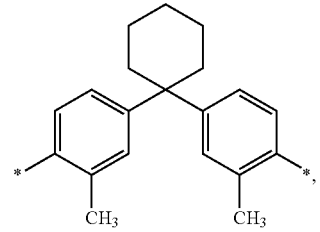

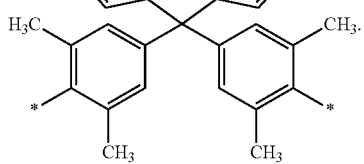

The repeating unit represented by Chemical Formula 10 may include a repeating unit represented by Chemical Formulae 10-1 to 10-7, or a combination thereof.

Chemical Formula 10-1

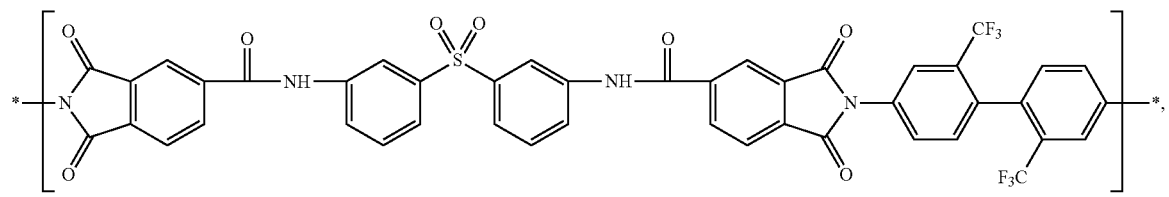

Chemical Formula 10-2

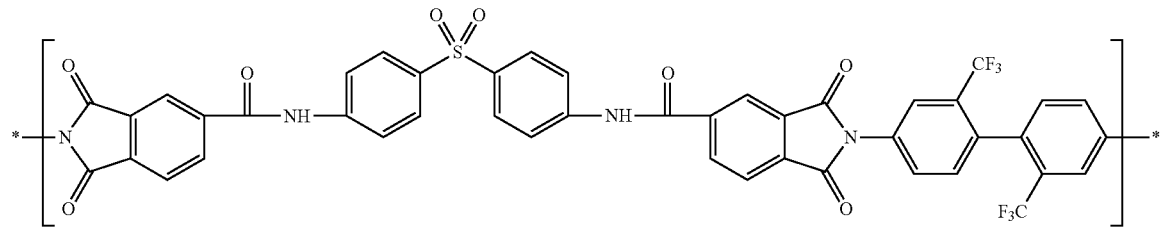

Chemical Formula 10-3
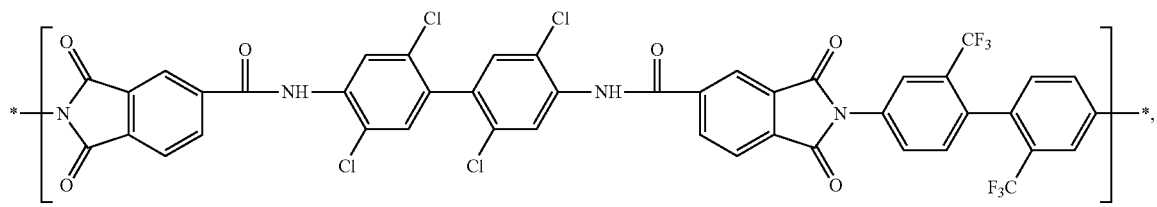
Chemical Formula 10-4
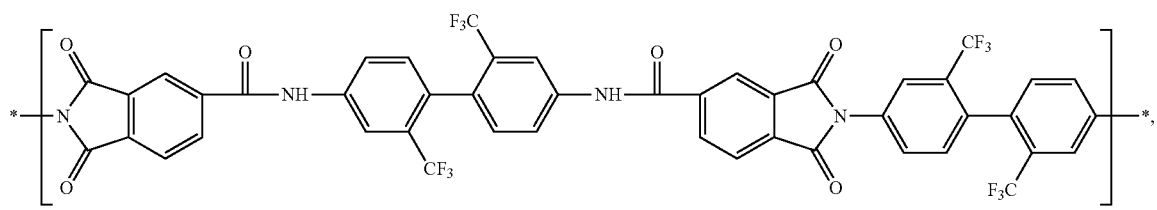
Chemical Formula 10-5
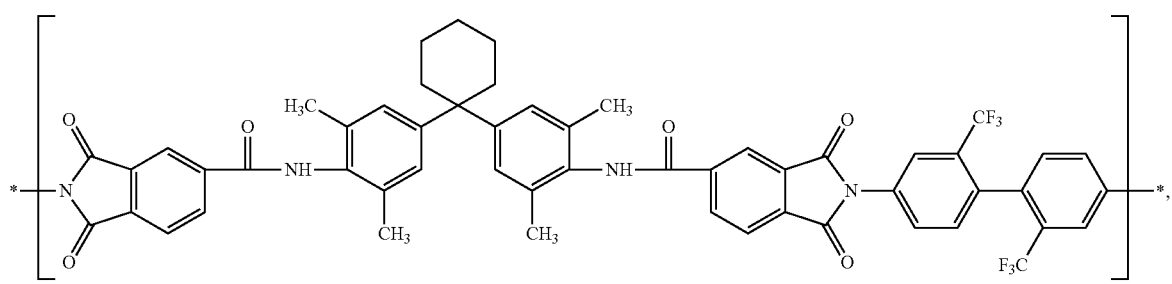
Chemical Formula 10-6
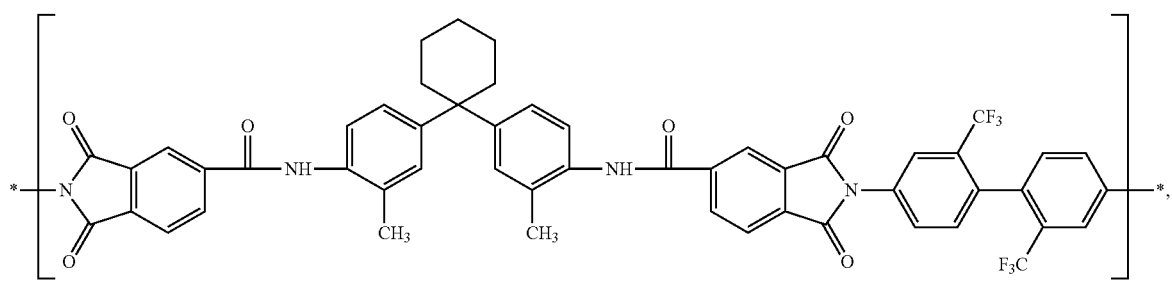
Chemical Formula 10-7
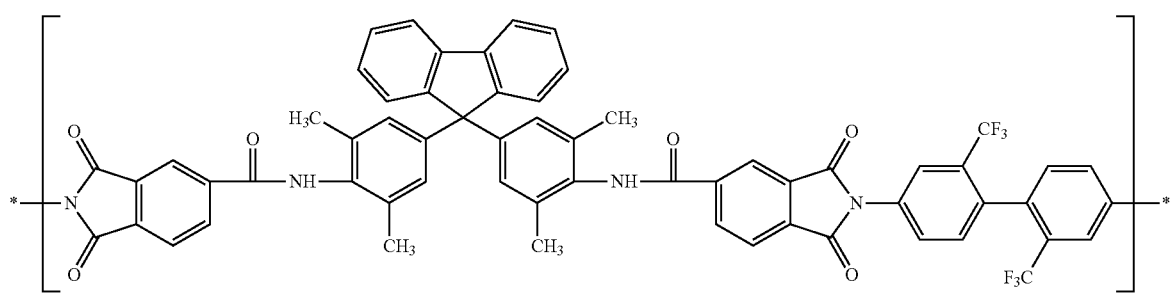

The polymer may have a weight average molecular weight ("Mw") of about 500 g/mol to about 50,000 g/mol.

According to another embodiment, a polymer including a repeating unit represented by Chemical Formula 20 and a repeating unit represented by Chemical Formula 21 is provided.

Chemical Formula 20

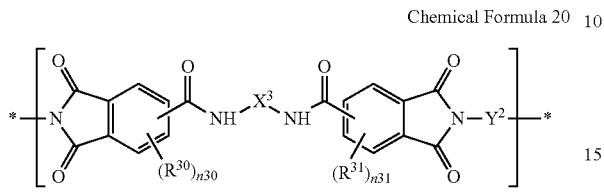

In Chemical Formula 20, $X^3$ is the same or different in each repeating unit and is independently a functional group represented by Chemical Formulae 2 to 7, $Y^2$ is the same or different in each repeating unit and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{30}$ and $R^{31}$ are the same or different, and are independently a halogen, a hydroxy group, an ether group (—OR$^{216}$, wherein R$^{216}$ is a C1 to C10 aliphatic organic group), a silyl group (—SiR$^{217}$R$^{218}$R$^{219}$, wherein R$^{217}$, R$^{218}$, and R$^{219}$ are the same or different and are independently hydrogen, or a C1 to C10 aliphatic organic group), a substituted or unsubstituted C1 to C10 aliphatic organic group, or a C6 to C20 aromatic organic group, and n30 and n31 are independently integers ranging from 0 to 3, Chemical Formula 2

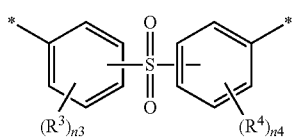

Chemical Formula 3

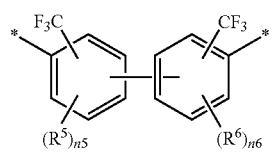

Chemical Formula 4

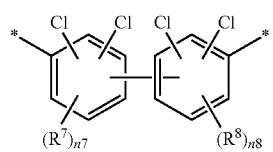

Chemical Formula 5

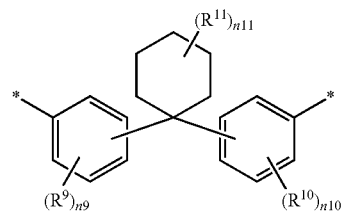

Chemical Formula 6

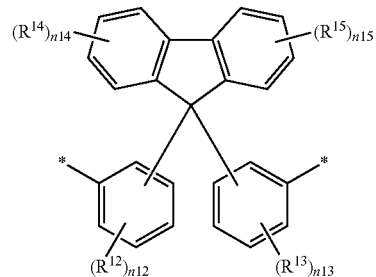

Chemical Formula 7

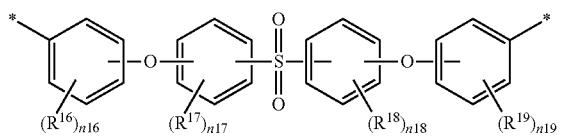

In Chemical Formulae 2 to 7, $R^3$ to $R^{19}$ are the same or different and are independently a halogen, a hydroxy group, an ether group (—OR$^{220}$, wherein R$^{220}$ is a C1 to C10 aliphatic organic group), a silyl group (—SiR$^{221}$R$^{222}$R$^{223}$, wherein R$^{221}$, R$^{222}$, R$^{223}$ are the same or different and are independently hydrogen, or a C1 to C10 aliphatic organic group), a substituted or unsubstituted C1 to C10 aliphatic organic group, or a C6 to C20 aromatic organic group, n3, n4, n9, n10, n12, n13, n14, n15, n16, n17, n18, and n19 are each independently integers ranging from 0 to 4, n5 and n6 are each independently integers ranging from 0 to 3, n7 and n8 are each independently integers ranging from 0 to 2, and n11 is an integer ranging from 0 to 10, Chemical Formula 21

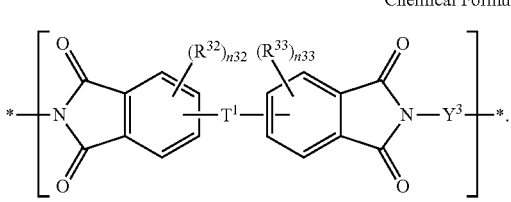

In Chemical Formula 21, $T^1$ is the same or different in each repeating unit and is independently a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $Y^3$ is the same or different in each repeating unit and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, R$^{32}$ and R$^{33}$ are the same or different and are independently a halogen, a hydroxy group, an ether group (—OR$^{224}$, wherein R$^{224}$ is a C1 to C10 aliphatic organic group), a silyl group (—SiR$^{225}$R$^{226}$R$^{227}$, wherein R$^{225}$, R$^{226}$, and R$^{227}$ are the same or different and are independently hydrogen, or a C1 to C10 aliphatic organic group), a substituted or unsubstituted C1 to C10 aliphatic organic group, or a C6 to C20 aromatic organic group, and n32 and n33 are independently integers ranging from 0 to 3.

In an embodiment, in Chemical Formula 20, X$^3$ may be a functional groups selected from Chemical Formulae.

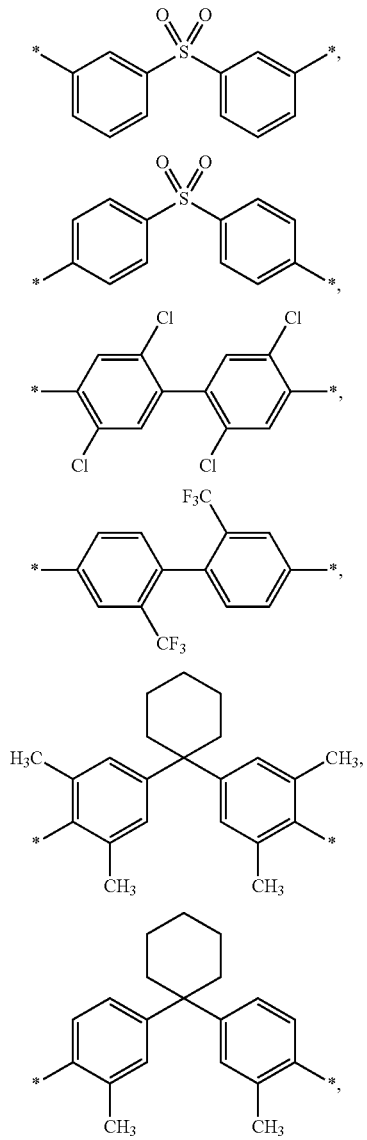

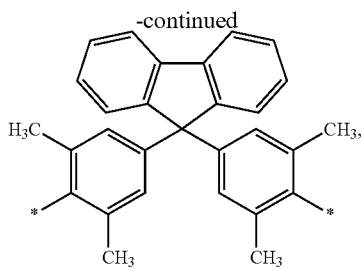

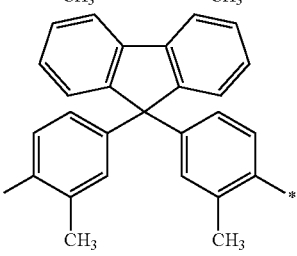

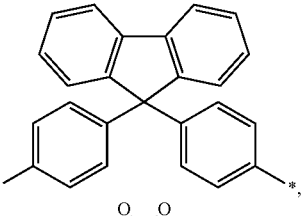

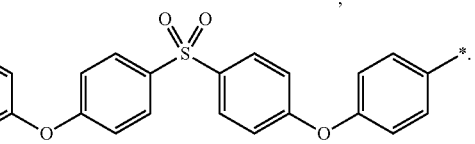

The repeating unit represented by Chemical Formula 21 may include a repeating unit represented by Chemical Formula 22, a repeating unit represented by Chemical Formula 23, or a combination thereof.

Chemical Formula 22

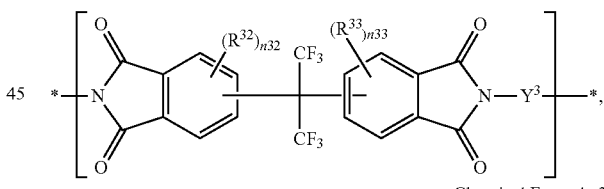

Chemical Formula 23

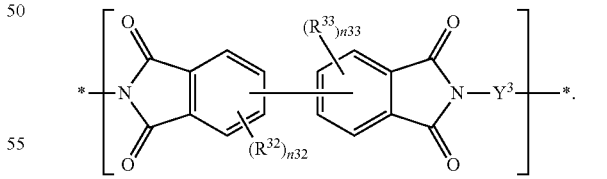

In Chemical Formulae 22 and 23,

Y$^3$ is the same or different in each repeating unit and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —$(CH_2)_p$— (wherein $1 \leq p \leq 10$), —$(CF_2)_q$— (wherein $1 \leq q \leq 10$), —$C(CH_3)_2$—, —$C(CF_3)_2$—, or —$C(=O)NH$—, $R^{32}$ and $R^{33}$ are the same or different and are independently a halogen, a hydroxy group, an ether group (—$OR^{224}$, wherein $R^{224}$ is a C1 to C10 aliphatic organic group), a silyl group (—$SiR^{225}R^{226}R^{227}$, wherein $R^{225}$, $R^{226}$, and $R^{227}$ are the same or different and are independently hydrogen, or a C1 to C10 aliphatic organic group), a substituted or unsubstituted C1 to C10 aliphatic organic group, or a C6 to C20 aromatic organic group, and n32 and n33 are independently integers ranging from 0 to 3.

In an embodiment, the repeating unit represented by Chemical Formula 20 may include a repeating unit represented by Chemical Formulae 20-1 to 20-10, or a combination thereof, and the repeating unit represented by Chemical Formula 21 may include a repeating unit represented by Chemical Formula 21-1, Chemical Formula 21-2, or a combination thereof.

Chemical Formula 20-1

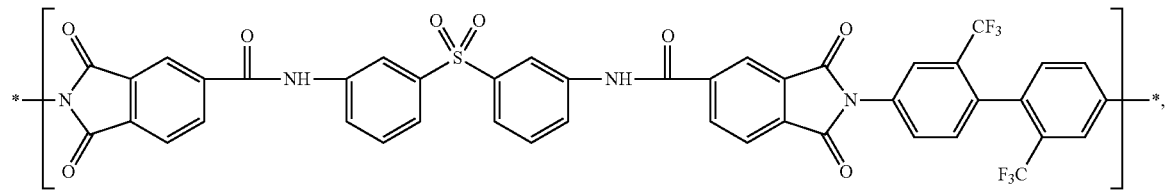

Chemical Formula 20-2

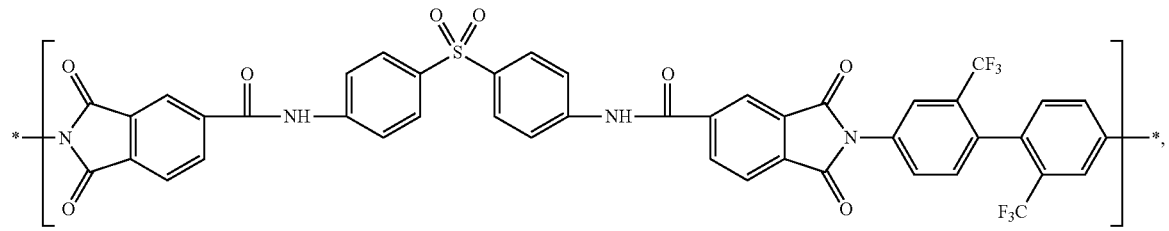

Chemical Formula 20-3

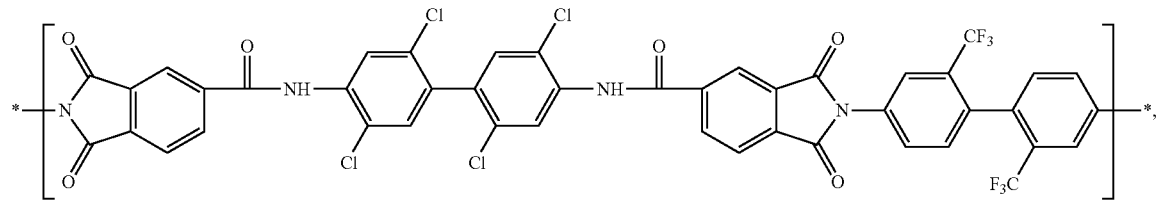

Chemical Formula 20-4

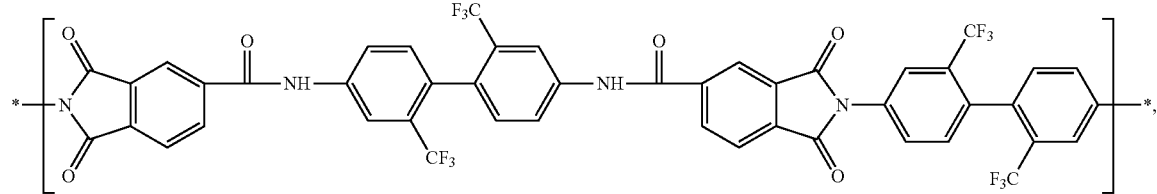

Chemical Formula 20-5

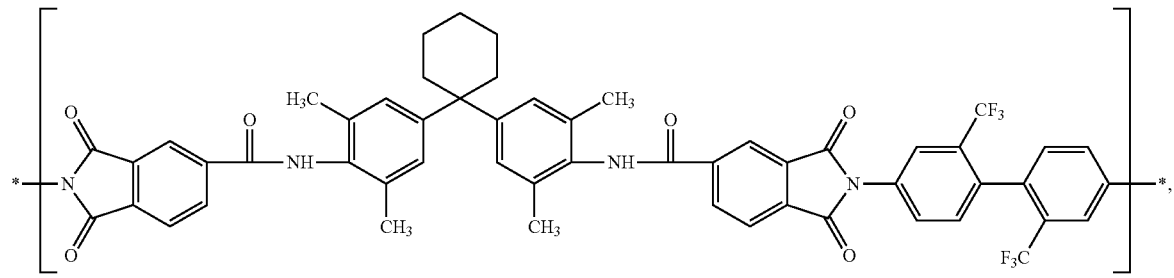

-continued
Chemical Formula 20-6
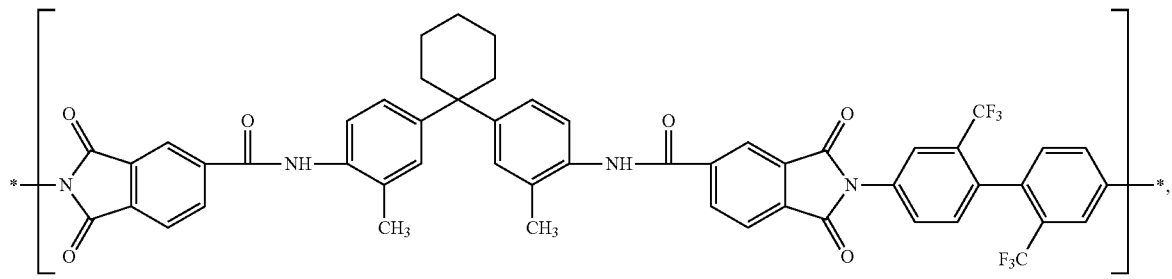
Chemical Formula 20-7
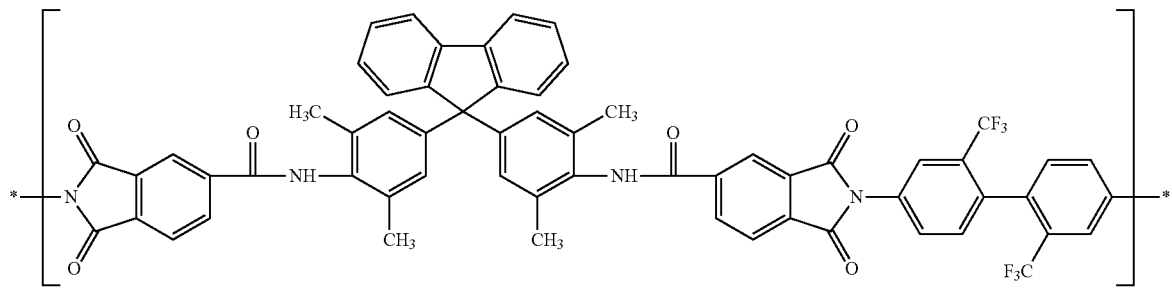
Chemical Formula 20-8
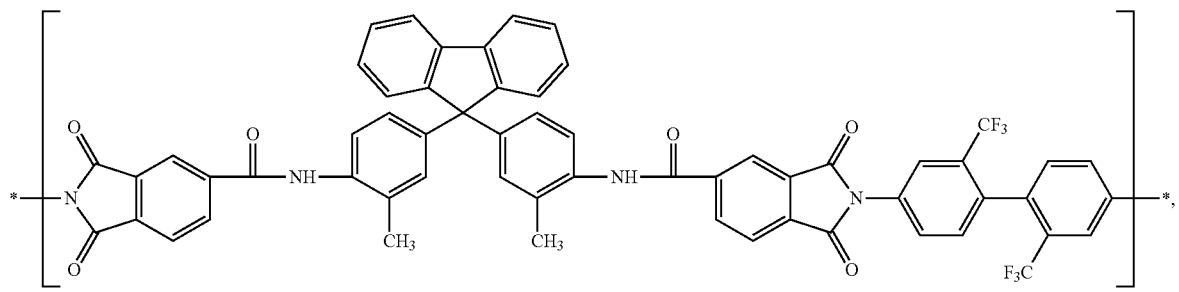
Chemical Formula 20-9
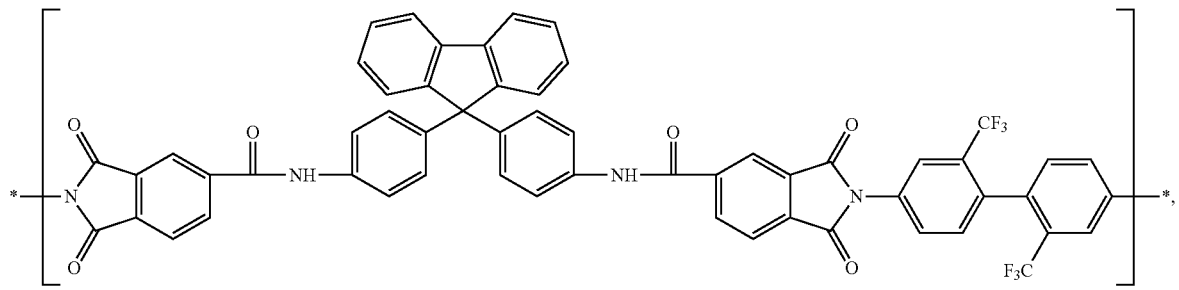
Chemical Formula 20-10
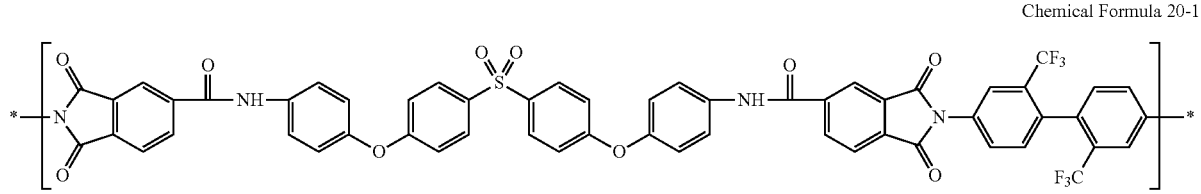
Chemical Formula 21-1
Chemical Formula 21-2
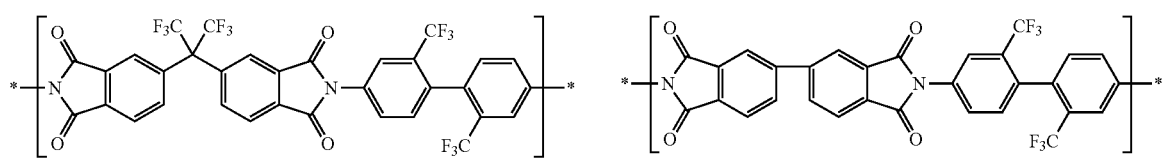

In the polymer, a mole ratio of the repeating unit represented by Chemical Formula 20 and the repeating unit represented by Chemical Formula 21 may be about 5:95 to about 95:5.

The polymer may have a weight average molecular weight ("Mw") of about 500 g/mol to about 50,000 g/mol.

According to another embodiment, an article prepared by using the polymer is provided.

The article may be a film, a fiber, or a coating material.

The article may have a total light transmittance of greater than or equal to 80% at a wavelength of about 380 nanometers ("nm") to about 780 nm, and may have a light transmittance of greater than or equal to about 70% at a wavelength of about 400 nm.

The article may have haze of less than or equal to about 5%.

The article may have a yellow index ("YI") of less than or equal to about 5.

According to yet another embodiment, a display device including the article is provided.

DETAILED DESCRIPTION

Figure 1:
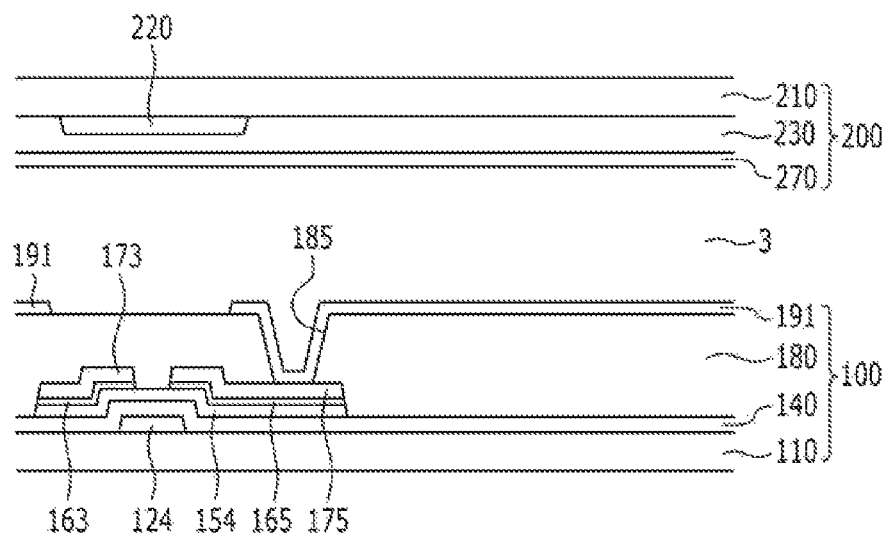
FIG. 1 is a cross-sectional view of a liquid crystal display ("LCD") according to an embodiment.

This disclosure will be described more fully hereinafter with reference to the accompanying drawings, in which embodiments are shown. This disclosure may, however, be embodied in many different forms and is not to be construed as limited to the exemplary embodiments set forth herein. Accordingly, the embodiments are merely described below, by referring to the figures, to explain aspects of the present description. These embodiments are provided so that this disclosure will be thorough and complete, and will fully convey the scope of the claims to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a", "an" and "the" are intended to include the plural forms as well, unless the context clearly indicates otherwise. The term "or" means "and/or". It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a specific definition is not otherwise provided, the term "substituted" refers to one substituted with at least one substituent including a halogen (—F, —Br, —Cl, or —I), a hydroxyl group (—OH), a nitro group (—NO$_2$), a cyano group (—CN), an amino group (NH$_2$, NH(R$^{100}$), or N(R$^{101}$)(R$^{102}$) wherein R$^{100}$, R$^{101}$, and R$^{102}$ are the same or different, and are each independently a C1 to 010 alkyl group), an amidino group [—C(=NH)N(R$^{103}$)(R$^{104}$), wherein R$^{103}$ and R$^{104}$ are the same or different, and are each independently hydrogen or a C1 to 010 alkyl group], a hydrazine group [—N(R$^{105}$)—N(R$^{106}$)(R$^{107}$), wherein R$^{105}$, R$^{106}$, and R$^{107}$ are the same or different, and are each independently hydrogen or a C1 to 010 alkyl group], a hydrazone group [=N—N(R$^{108}$)(R$^{109}$), wherein R$^{108}$ and R$^{109}$ are the same or different, and are each independently hydrogen or a C1 to 010 alkyl group], a carboxyl group [—C(=O)OH], an ester group [—C(=O)O(R$^{110}$), wherein R$^{110}$ is a C1 to 010 alkyl group], a ketone group [—C(=O)—], a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

"Alkyl" as used herein means a straight or branched chain saturated aliphatic hydrocarbon having the specified number of carbon atoms, for example methyl, ethyl, propyl, and butyl groups.

"Cycloalkyl" as used herein means a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclooctenyl) or cycloalkynyl (e.g., cyclooctynyl) groups. Cycloalkyl groups do not include an aromatic ring or a heterocyclic ring. When the numbers of carbon atoms is specified (e.g., C3-C15 cycloalkyl), the number means the number of ring members present in the one or more rings.

"Heterocyclic" as used herein means a cycloalkyl group wherein the cycloalkyl group includes at least one heteroatom (e.g., 1, 2, or 3 heteroatom(s)), wherein the heteroatom(s) is each independently N, O, S, Si, or P.

"Alkenyl" as used herein means a straight or branched chain, monovalent hydrocarbon group having at least one carbon-carbon double bond (e.g., ethenyl (—HC=CH$_2$)).

"Alkynyl" as used herein means a straight or branched chain, monovalent hydrocarbon group having at least one carbon-carbon triple bond (e.g., ethynyl).

"Alkoxy" as used herein means an alkyl group that is linked via an oxygen (i.e., alkyl-O—), for example methoxy, ethoxy, and sec-butyloxy groups.

"Aryl" as used herein means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof.

"Heteroaryl" as used herein means a monovalent carbocyclic ring group that includes one or more aromatic rings, in which at least one ring member (e.g., one, two or three ring members) is a heteroatom (e.g., nitrogen (N), oxygen (O), phosphorus (P), silicon (Si), and sulfur (S)). Multiple rings, if present, may be pendent, spiro or fused.

"Alkylene" as used herein means a straight or branched chain, saturated, divalent aliphatic hydrocarbon group, (e.g., methylene (—CH$_2$—) or, propylene (—(CH$_2$)$_3$—)).

"Alkynylene" as used herein means a straight or branched chain divalent aliphatic hydrocarbon that has one or more unsaturated carbon-carbon bonds, at least one of which is a triple bond (e.g., ethynylene).

"Cycloalkylene" as used herein means a divalent group that comprises one or more saturated and/or partially saturated rings in which all ring members are carbon, such as cyclopropylene, cyclobutylene, cyclopentylene, cyclohexylene, cycloheptylene, cyclooctylene, adamantylene and partially saturated variants of the foregoing, such as cycloalkenylene groups (e.g., cyclooctenylene) or cycloalkynylene (e.g., cyclooctynylene) groups.

"Arylene" as used herein means a divalent group formed by the removal of two hydrogen atoms from one or more rings of an arene, wherein the hydrogen atoms may be removed from the same or different rings (e.g., phenylene or napthylene).

As used herein, when a specific definition is not otherwise provided, the term "alkyl group" may refer to a C1 to C30 alkyl group, and specifically a C1 to C15 alkyl group, the term "cycloalkyl group" may refer to a C3 to C30 cycloalkyl group, and specifically a C3 to C18 cycloalkyl group, the term "alkoxy group" may refer to a C1 to C30 alkoxy group, and specifically a C1 to C18 alkoxy group, the term "ester group" may refer to a C2 to C30 ester group, and specifically a C2 to C18 ester group, the term "ketone group" may refer to a C2 to C30 ketone group, and specifically a C2 to C18 ketone group, the term "aryl group" may refer to a C6 to C30 aryl group, and specifically a C6 to C18 aryl group, the term "alkenyl group" may refer to a C2 to C30 alkenyl group, and specifically a C2 to C18 alkenyl group, the term "alkylene group" may refer to a C1 to C30 alkylene group, and specifically a C1 to C18 alkylene group, and the term "arylene group" may refer to a C6 to C30 arylene group, and specifically a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group, the term "aromatic organic group" refers to a C6 to C30 aryl group or a C6 to C30 arylene group, specifically a C6 to C16 aryl group or a C6 to C16 arylene group, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to a point of attachment of a given fragment or a repeating unit to another fragment or a repeating group.

According to an embodiment, a novel material for an optical film including a compound represented by the following Chemical Formula 1 is provided.

Chemical Formula 1

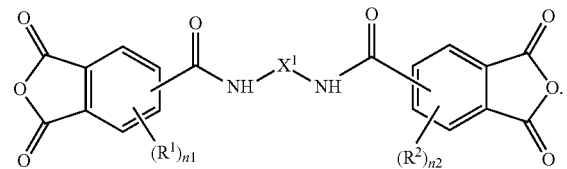

In Chemical Formula 1,

X$^1$ is a functional group represented by the following Chemical Formulae 2 to 6, R$^1$ and R$^2$ are the same or different and are independently a halogen, a hydroxy group, an ether group (—OR$^{200}$, wherein R$^{200}$ is a C1 to 010 aliphatic organic group), a silyl group (—SiR$^{201}$R$^{202}$R$^{203}$, wherein R$^{201}$, R$^{202}$, and R$^{203}$ are the same or different and are independently hydrogen, or a C1 to 010 aliphatic organic group), a substituted or unsubstituted C1 to 010 aliphatic organic group, or a C6 to C20 aromatic organic group, specifically a halogen, or a C1 to C5 alkyl group.

n1 and n2 are each independently integers ranging from 0 to 3, and specifically each is 0.

Chemical Formula 2

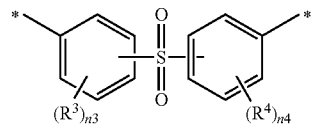

-continued

Chemical Formula 3

Chemical Formula 4

Chemical Formula 5

Chemical Formula 6

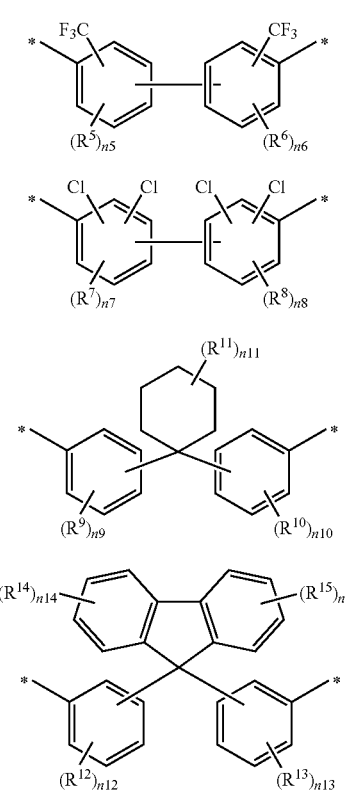

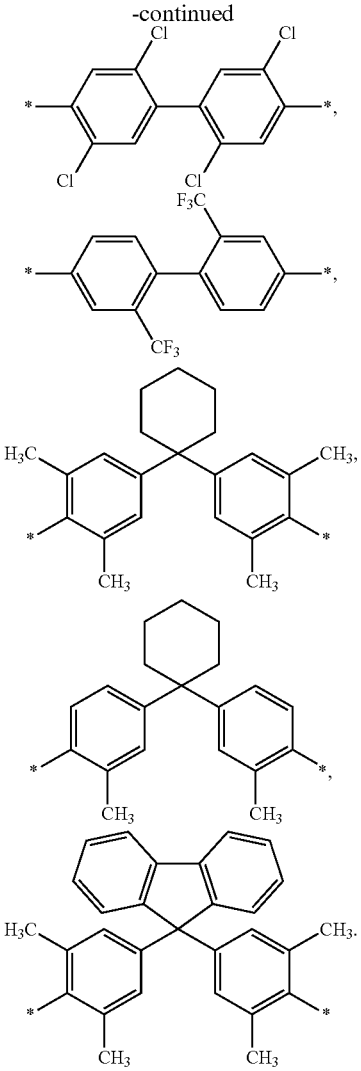

In Chemical Formulae 2 to 6, $R^3$ to $R^{15}$ are the same or different and are independently a halogen, a hydroxy group, an ether group ($-OR^{204}$, wherein $R^{204}$ is a C1 to C10 aliphatic organic group), a silyl group ($-SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a C6 to C20 aromatic organic group, specifically, a halogen, or a C1 to C5 alkyl group, n3, n4, n9, n10, n12, n13, n14, and n15 are each independently integers ranging from 0 to 4, n5 and n6 are each independently integers ranging from 0 to 3, and specifically each is 0, n7 and n8 are each independently integers ranging from 0 to 2, and n11 is an integer ranging from 0 to 10.

In an embodiment, in the above Chemical Formula 1, $X^1$ may be a functional group represented by the following Chemical Formulae, but is not limited thereto.

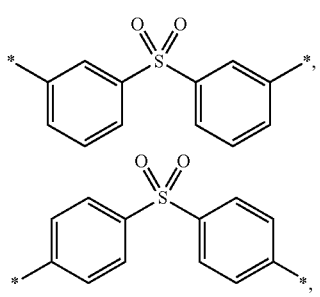

The material for an optical film includes an amide bond in a molecule and thus needs no reaction for forming an amide bond and post process does not require removal of hydrogen chloride (HCl). This improves processing and economic characteristics of the optical film preparation.

In addition, the material for an optical film has excellent transparency and excellent thermal properties.

Hereinafter, a novel material for an optical film including a compound represented by the above Chemical Formula 1 is illustrated.

First of all, diamine including an $X^1$ functional group and pyridine are mixed in dry acetone. The mixture is placed in a funnel.

Next, another solution is prepared by dissolving trimellitic anhydride in dry acetone. While this solution is refluxed under a nitrogen atmosphere, the diamine and pyridine solution is slowly added thereto.

Herein, a yellow solid may sometimes be immediately precipitated, but a yellow solution may be at other times prepared.

The obtained mixture is additionally refluxed and then cooled down to room temperature.

The next processes are performed as follows.

(a) When a product is insoluble in acetone (for example, DA48, DA69, DA76, DA96, DA98, DA100), the product is filtered, washed with dry acetone, and dried. The obtained solid is suspended with acetic anhydride and then refluxed.

The refluxed reactant is cooled down to room temperature and then filtered, dried with dry acetone, and dried in a vacuum oven.

(b) When a product is soluble in acetone (for example, DA50, DA66, DA67, DA73), deionized water is added to the product to carefully perform precipitation. The obtained oily material is gradually solidified, dried and then ground into powder.

The powder is filtered, washed with water, and dried in a vacuum oven.

The obtained solid is suspended with acetic anhydride and then refluxed.

The refluxed reactant is cooled down to room temperature. The post processes are performed as follows.

(b1) When a solid product is precipitated (for example, DA67 and DA73), the products are filtered, washed with an appropriate solvent such as acetone, toluene, hexane, and the like, and dried in a vacuum oven.

(b2) When a solid product is not precipitated (for example, DA50 and DA66), an appropriate solvent such as toluene, hexane, and the like is added thereto to forcefully perform precipitation.

The obtained solid is filtered, washed, and dried in a vacuum oven.

According to another embodiment, a polymer including a repeating unit represented by the following Chemical Formula 10 is provided.

Chemical Formula 10

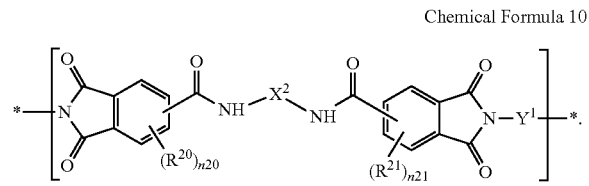

In Chemical Formula 10, $X^2$ is the same or different in each repeating unit, and is independently a functional group represented by the following Chemical Formulae 2 to 6.

$Y^1$ is the same or different in each repeating unit, and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and specifically at least one hydrogen of the aromatic organic group may be substituted with an electron withdrawing group.

Herein, the electron withdrawing group may be —CF$_3$, —CCl$_3$, —CBr$_3$, —CI$_3$, —F, —Cl, —Br, —I, —NO$_2$, —CN, —COCH$_3$, or —CO$_2$C$_2$H$_5$, but is not limited thereto.

$R^{20}$ and $R^{21}$ are the same or different and are independently a halogen, a hydroxy group, an ether group (—OR$^{208}$, wherein R$^{208}$ is a C1 to C10 aliphatic organic group), a silyl group (—SiR$^{209}$R$^{210}$R$^{211}$, wherein R$^{209}$, R$^{210}$ and R$^{211}$ are the same or different and are independently hydrogen, or a C1 to C10 aliphatic organic group), a substituted or unsubstituted C1 to C10 aliphatic organic group, or a C6 to C20 aromatic organic group, specifically a halogen, or a C1 to C5 alkyl group.

n20 and n21 are each independently integers ranging from 0 to 3, and specifically each is 0.

As stated above, $X^2$ is the same or different in each repeating unit, and is independently a functional group represented by Chemical Formulae 2 to 6.

Chemical Formula 2

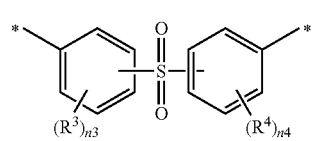

Chemical Formula 3

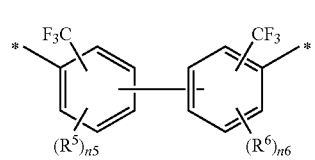

Chemical Formula 4

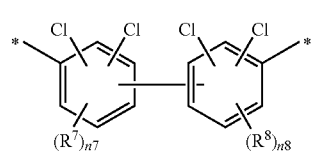

Chemical Formula 5

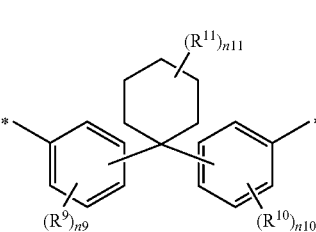

Chemical Formula 6

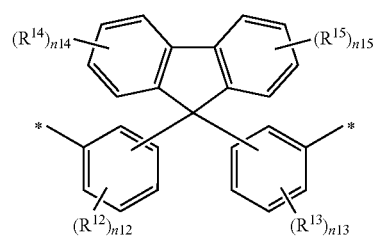

In Chemical Formulae 2 to 6, $R^3$ to $R^{15}$ are the same or different and are independently a halogen, a hydroxy group, an ether group (—OR$^{212}$, wherein R$^{212}$ is a C1 to C10 aliphatic organic group), a silyl group (—SiR$^{213}$R$^{214}$R$^{215}$, wherein R$^{213}$, R$^{214}$, and R$^{215}$ are the same or different and are independently hydrogen, or a C1 to C10 aliphatic organic group), a substituted or unsubstituted C1 to C10 aliphatic organic group, or a C6 to C20 aromatic organic group, n3, n4, n9, n10, n12, n13, n14, and n15 are each independently integers ranging from 0 to 4, n5 and n6 are each independently integers ranging from 0 to 3, n7 and n8 are each independently integers ranging from 0 to 2, and n11 is an integer ranging from 0 to 10.

In an embodiment, in Chemical Formula 10, $X^2$ is a functional group represented by the following Chemical Formulae, but is not limited thereto.

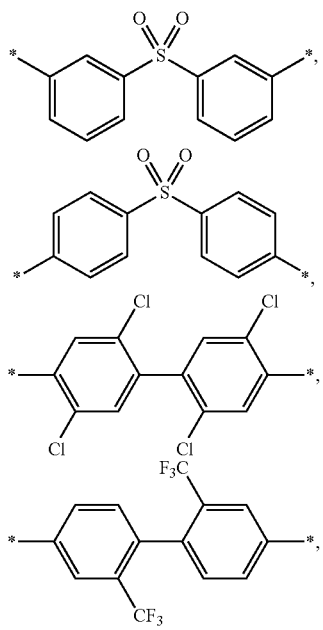

-continued

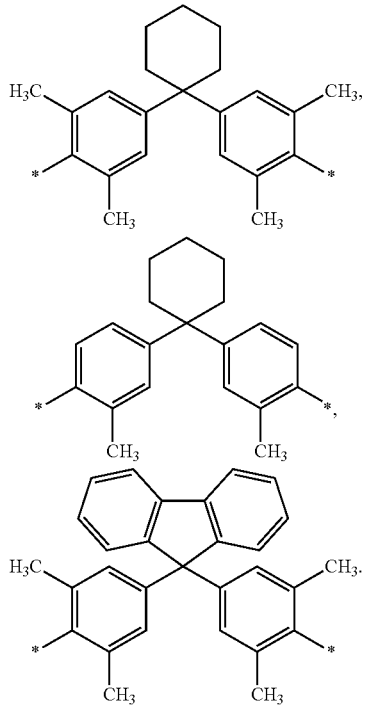

In an embodiment, in Chemical Formula 10, $X^2$ is a functional group represented by the following Chemical Formulae, but is not limited thereto.

Chemical Formula 10-1

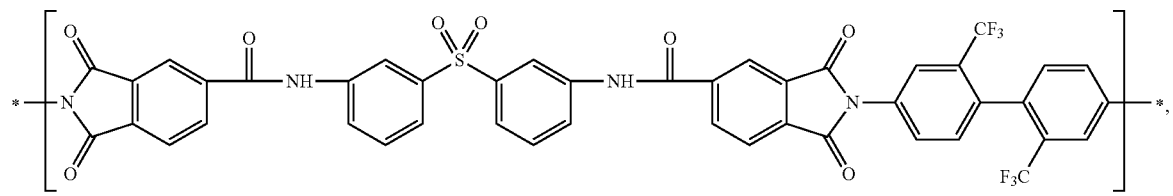

Chemical Formula 10-2

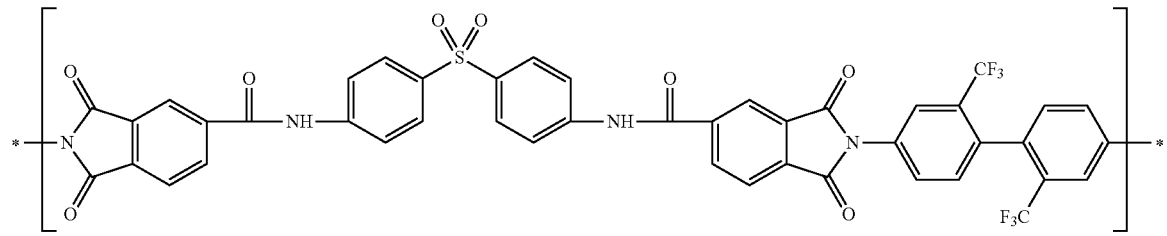

Chemical Formula 10-3

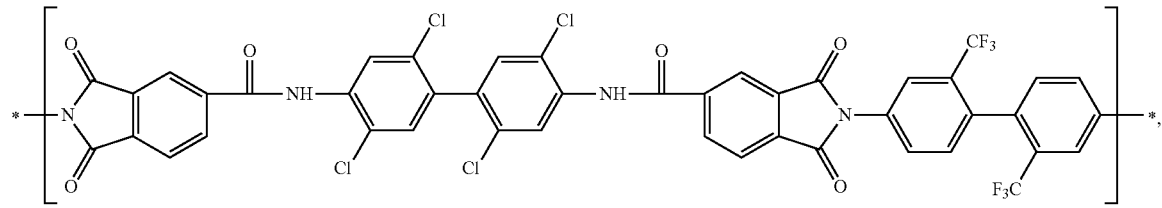

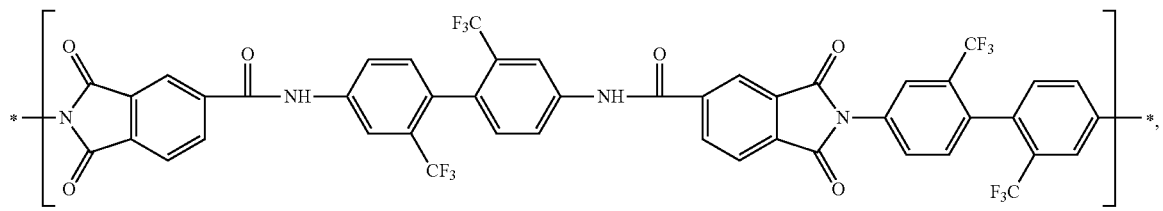

Chemical 10-4

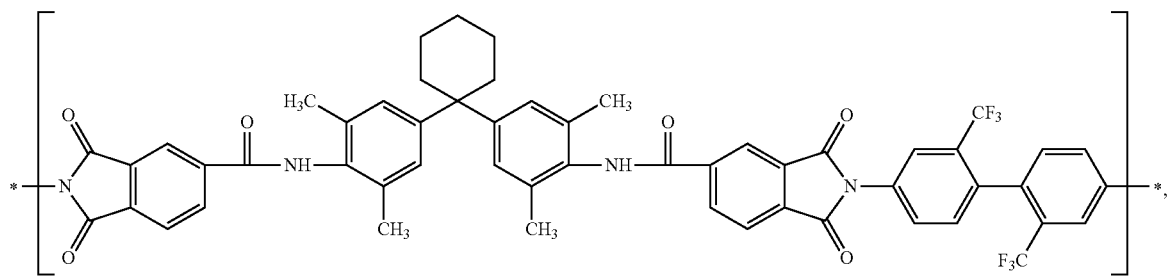

Chemical Formula 10-5

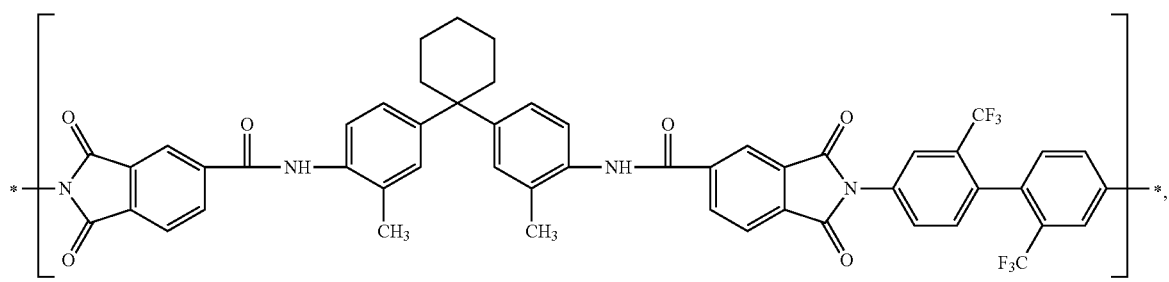

Chemical Formula 10-6

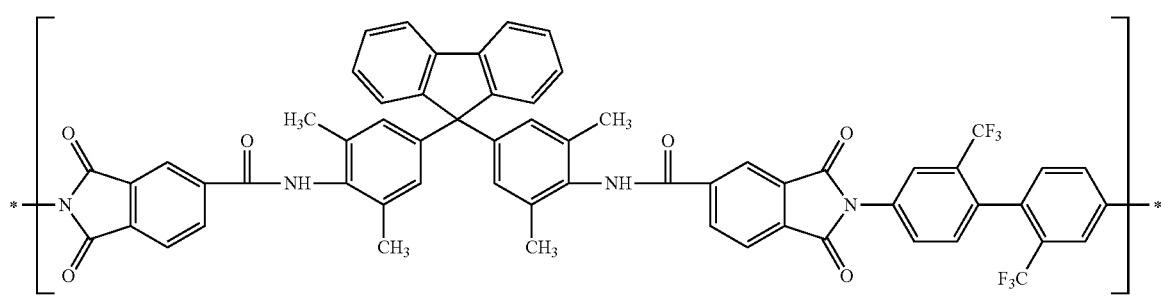

Chemical Formula 10-7

A polymer including the repeating unit represented by the above Chemical Formula 10 includes an amide bond. Therefore, solubility in a solvent, workability, flexibility, and optical properties, for example transparency, may be improved, and a coefficient of thermal expansion may be decreased.

The polymer including the repeating unit represented by the above Chemical Formula 10 includes an imide bond, and therefore heat resistance and mechanical strength may be improved, solvent resistance during article preparation may be improved, and crystallization production may be suppressed during elongation.

The polymer including the repeating unit represented by the above Chemical Formula 10 may have a weight average molecular weight ("Mw") of about 500 g/mol to about 500,000 g/mol, specifically of about 1,000 g/mol to about 500,000 g/mol, more specifically of about 10,000 g/mol to about 500,000 g/mol.

When the polymer has a weight average molecular weight within these range, the polymer or article prepared by using the polymer may have improved workability, flexibility, optical properties, heat resistance, and mechanical strength.

In an embodiment, the polymer may have a weight average molecular weight of about 5,000 g/mol to about 300,000 g/mol, specifically of about 1,000 g/mol to about 300,000 g/mol, more specifically of about 10,000 g/mol to about 300,000 g/mol.

According to another embodiment, a polymer including a repeating unit represented by the following Chemical Formula 20 and a repeating unit represented by the following Chemical Formula 21 is provided.

Chemical Formula 20

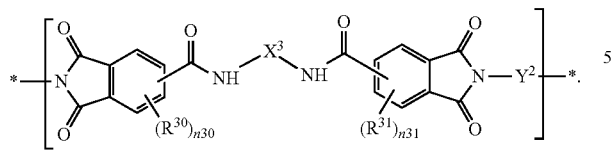

Chemical Formula 21

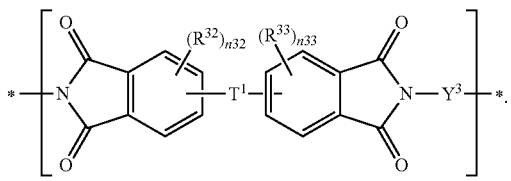

In Chemical Formula 20, $X^3$ is the same or different in each repeating unit, and is independently a functional group represented by the following Chemical Formulae 2 to 6 as described above in Chemical Formula 10, and a functional group represented by the following Chemical Formula 7, $Y^2$ is the same or different in each repeating unit, and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, specifically at least one hydrogen of the aromatic organic group may be substituted with an electron withdrawing group.

Herein, the electron withdrawing group is the same as described above.

$R^{30}$ and $R^{31}$ are the same or different and are independently a halogen, a hydroxy group, an ether group (—OR$^{216}$, wherein R$^{216}$ is a C1 to 010 aliphatic organic group), a silyl group (—SiR$^{217}$R$^{218}$R$^{219}$, wherein R$^{217}$, R$^{218}$, and R$^{219}$ are the same or different and are independently or a C1 to 010 aliphatic organic group), a substituted or unsubstituted C1 to 010 aliphatic organic group, or a C6 to C20 aromatic organic group, specifically a halogen, or a C1 to C5 alkyl group.

n30 and n31 are independently integers ranging from 0 to 3, and specifically each is 0.

Chemical Formula 7

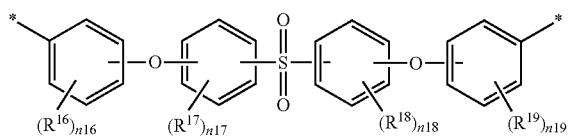

In Chemical Formula 7, $R^{16}$ to $R^{19}$ are the same or different and are independently a halogen, a hydroxy group, an ether group (—OR$^{220}$, wherein R$^{220}$ is a C1 to 010 aliphatic organic group), a silyl group (—SiR$^{221}$R$^{222}$R$^{223}$, wherein R$^{221}$, R$^{222}$, R$^{223}$ are the same or different and are independently hydrogen, or a C1 to 010 aliphatic organic group), a substituted or unsubstituted C1 to 010 aliphatic organic group, or a C6 to C20 aromatic organic group, specifically a halogen, or a C1 to C5 alkyl group.

n16, n17, n18, and n19 are each independently integers ranging from 0 to 4, and specifically each is 0.

In Chemical Formula 21, $T^1$ is the same or different in each repeating unit and is independently a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, specifically a single bond or a substituted or unsubstituted C1 to C10 aliphatic organic group, and more specifically a single bond or —C(CF$_3$)$_2$—.

$Y^3$ is the same or different in each repeating unit and independently includes a substituted or unsubstituted C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, and specifically at least one hydrogen of the aromatic organic group may be substituted with an electron withdrawing group.

Herein, the electron withdrawing group is the same as described above.

$R^{32}$ and $R^{33}$ are the same or different and are independently a halogen, a hydroxy group, an ether group (—OR$^{224}$, wherein R$^{224}$ is a C1 to C10 aliphatic organic group), a silyl group (—SiR$^{225}$R$^{226}$R$^{227}$, wherein R$^{225}$, R$^{226}$, and R$^{227}$ are the same or different and are independently hydrogen, or a C1 to C10 aliphatic organic group), a substituted or unsubstituted C1 to C10 aliphatic organic group, or a C6 to C20 aromatic organic group, specifically a halogen, or a C1 to C5 alkyl group.

n32 and n33 are independently integers ranging from 0 to 3, and specifically each is 0. In an embodiment, in the above Chemical Formula 20, $X^3$ may be a functional group represented by the following Chemical Formulae, but is not limited thereto.

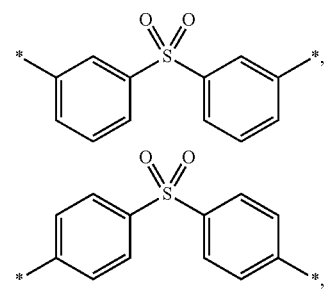

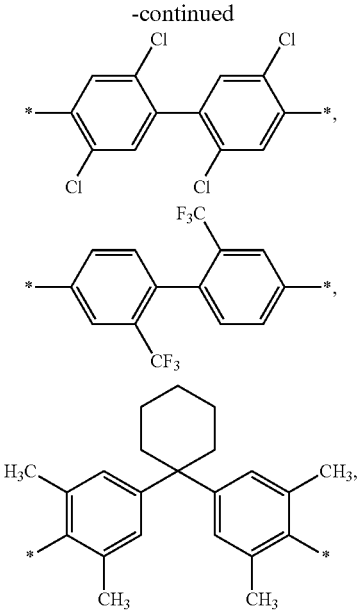

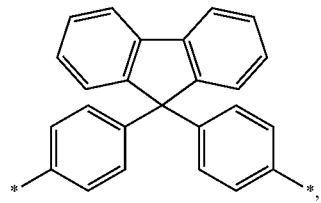

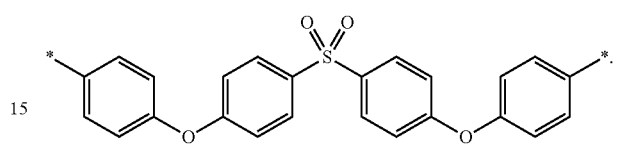

In an embodiment, the repeating unit represented by the above Chemical Formula 21 may include a repeating unit represented by the following Chemical Formulae 22, 23, or a combination thereof, but is not limited thereto.

Chemical Formula 22

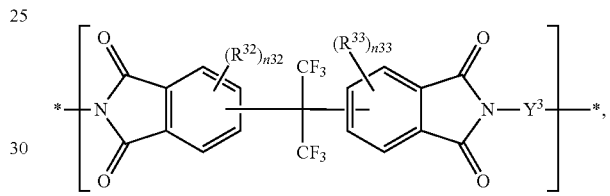

Chemical Formula 23

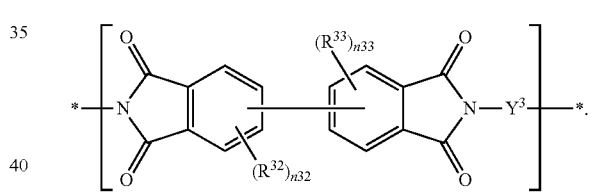

In Chemical Formulae 22 and 23, $Y^3$, $R^{32}$, $R^{33}$, n32, and n33 are the same as defined in the above Chemical Formula 21.

In another embodiment, the repeating unit represented by the above Chemical Formula 20 may include a repeating unit represented by the following Chemical Formulae 20-1 to 20-10, or a combination thereof, and the repeating unit represented by the above Chemical Formula 21 may include a repeating unit represented by the following Chemical Formula 21-1, the following Chemical Formula 21-2, or a combination thereof, but is not limited thereto.

Chemical Formula 20-1

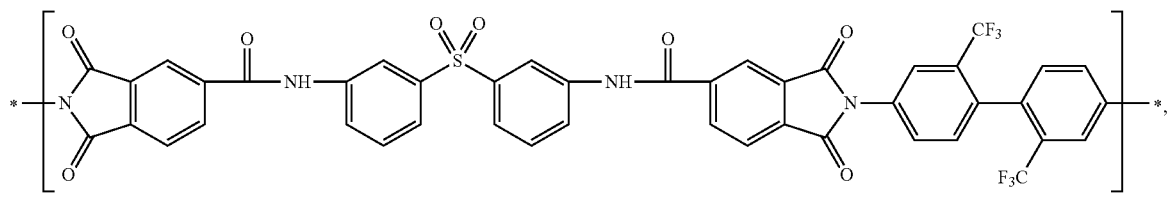

Chemical Formula 20-2
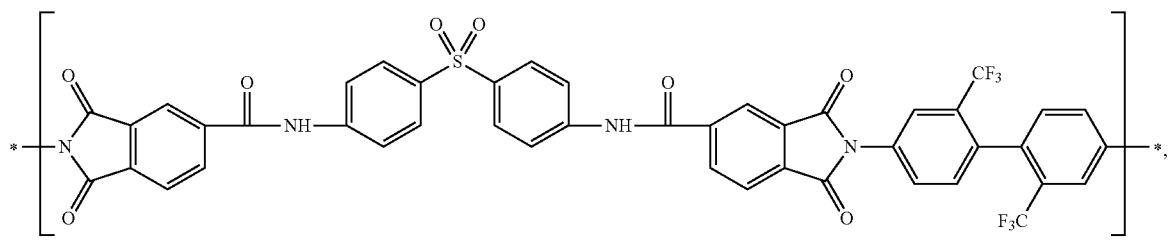
Chemical Formula 20-3
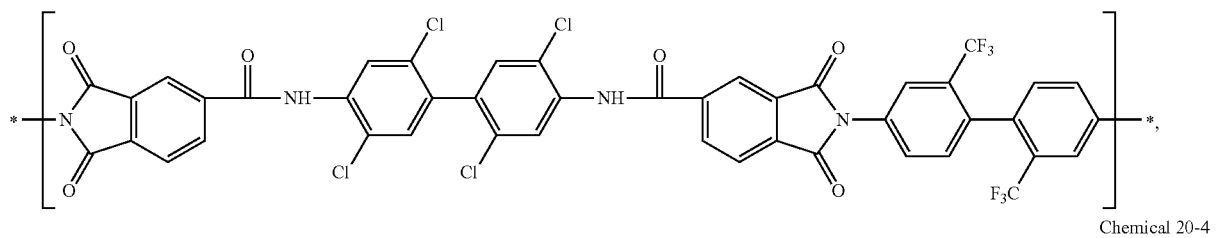
Chemical 20-4
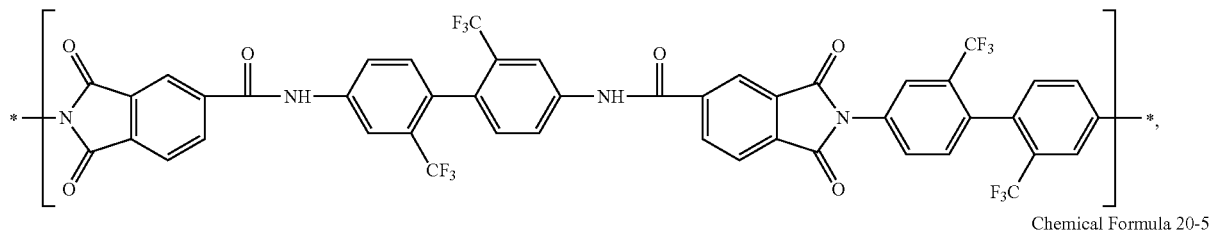
Chemical Formula 20-5
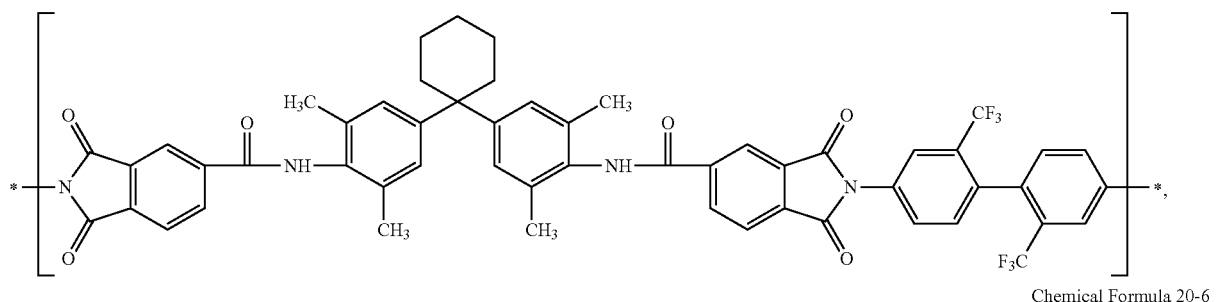
Chemical Formula 20-6
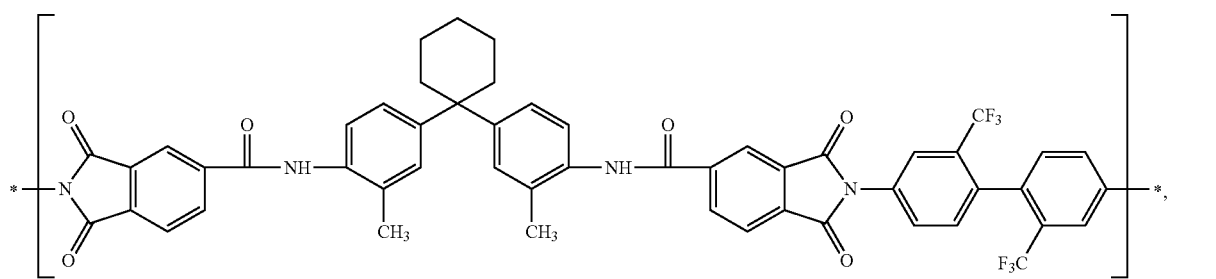
Chemical Formula 20-7
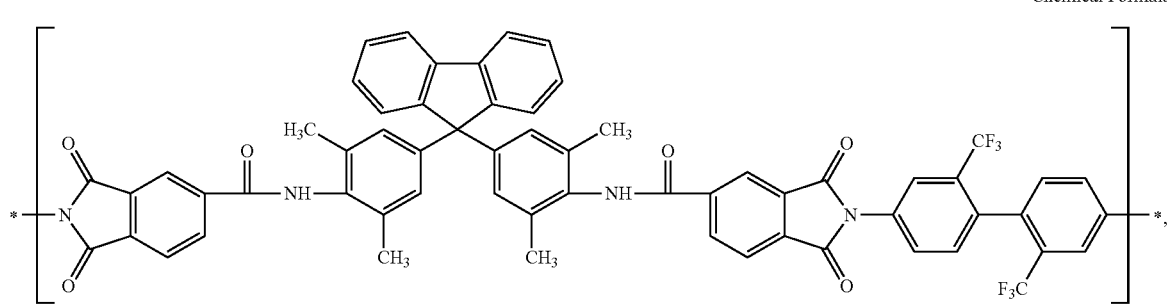

-continued

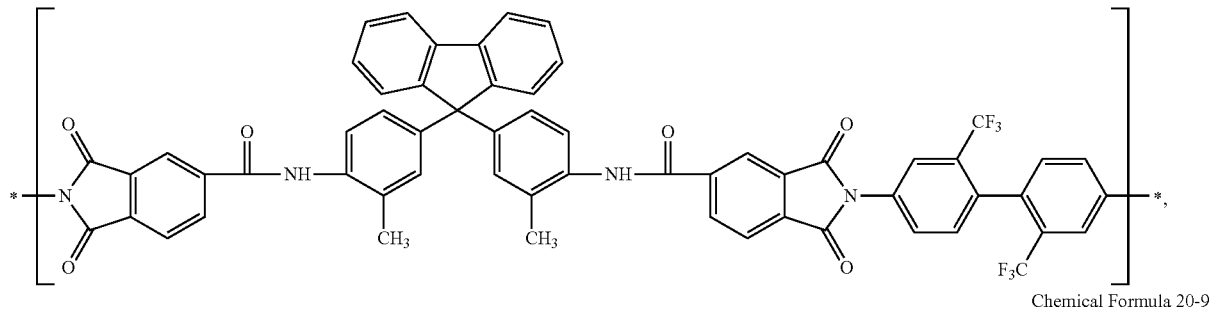

Chemical Formula 20-8

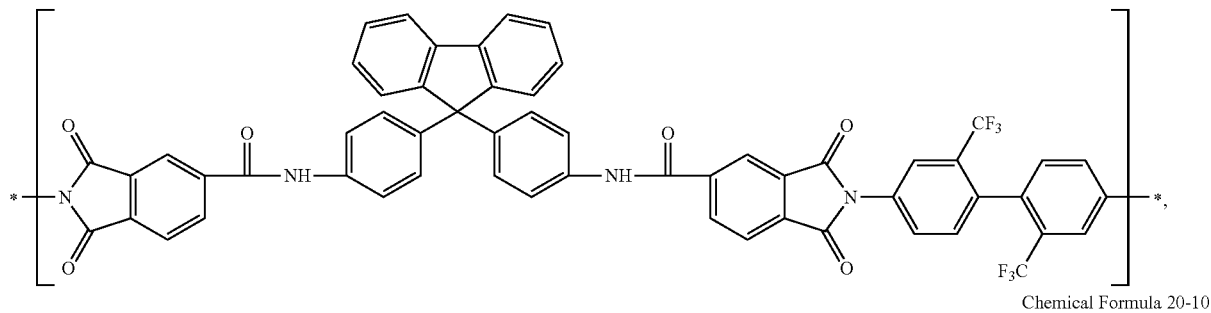

Chemical Formula 20-9

Chemical Formula 20-10

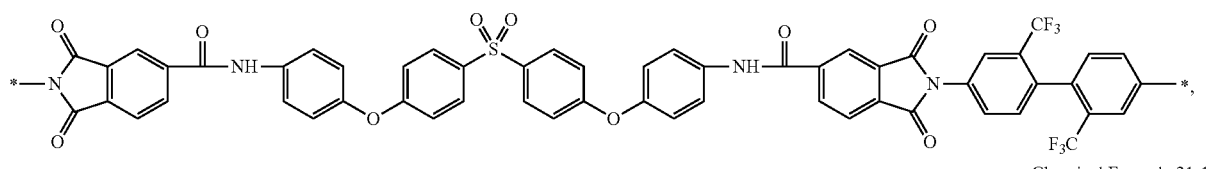

Chemical Formula 21-1

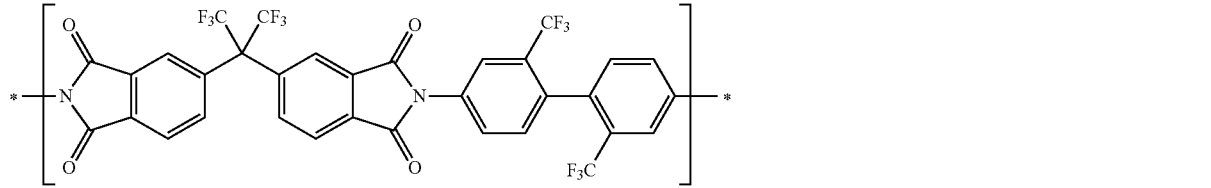

Chemical Formula 21-2

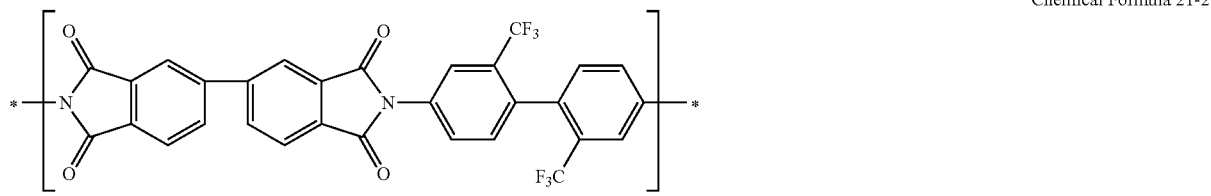

In the polymer including the repeating unit represented by the above Chemical Formula 20 and the repeating unit represented by the above Chemical Formula 21, since the repeating unit represented by the above Chemical Formula 20 includes an amide bond and an imide bond, the polymer may have improved solubility in a solvent, workability, flexibility, and optical properties, for example transparency, a low coefficient of thermal expansion, and improved heat resistance and mechanical strength. In addition, crystallization production may be suppressed during elongation.

Since the repeating unit represented by the above Chemical Formula 21 includes an imide bond, the polymer has improved heat resistance, mechanical strength, and solvent resistance. In addition, crystallization production may be suppressed during elongation, and has excellent optical properties.

The polymer may include the repeating unit represented by the above Chemical Formula 20 and the repeating unit represented by the above Chemical Formula 21 in a mole ratio of about 5:95 to about 95:5, specifically of about 10:90 to about 90:10, more specifically of about 20:80 to about 80:20, even more specifically of about 30:70 to about 70:30.

Within the above ranges, light transmittance may be improved.

In an embodiment, the polymer may include the repeating unit represented by the above Chemical Formula 20 and the repeating unit represented by the above Chemical Formula 21 in a mole ratio of about 60:40 to about 90:10.

The polymer including the repeating unit represented by the above Chemical Formula 20 and the repeating unit represented by the above Chemical Formula 21 may have a weight average molecular weight ("Mw") of about 500 g/mol to about 500,000 g/mol, specifically of about 1,000 g/mol to about 500,000 g/mol, more specifically of about 10,000 g/mol to about 500,000 g/mol.

When the weight average molecular weight of the polymer is within these ranges, the polymer or article prepared by using the polymer may have improved workability, flexibility, optical properties, heat resistance, and mechanical strength.

In an embodiment, the polymer may have a weight average molecular weight of about 5,000 g/mol to about 300,000 g/mol, specifically of about 1,000 g/mol to about 300,000 g/mol, more specifically of about 10,000 g/mol to about 300,000 g/mol.

Therefore, the polymer may be used as a material for diverse articles requiring transparency.

For example, the polymer may be usefully used for a variety of areas, such as a substrate for a display device, which includes a substrate for a flexible display device, a touch panel, and a protective film for an optical disk.

According to an embodiment, the polymer may have total light transmittance of greater than or equal to about 70% in a wavelength range of about 380 nm to about 780 nm, and may have light transmittance of greater than or equal to about 70% at a wavelength of about 400 nm.

When the polymer has light transmittance within this range, the polymer may be used for manufacturing of articles of diverse areas requiring transparency and may have excellent color reproducibility.

In an embodiment, the polymer may have total light transmittance of about 80% to about 95% in a wavelength range of about 380 nm to about 780 nm, and may have light transmittance of about 70% to about 90% at a wavelength of about 400 nm.

Hereafter, a method for preparing the polymer is described.

The polymer may be prepared through a method such as a solution polymerization method, an interface polymerization method, a melt polymerization method, and a solid-phase polymerization method, without limitation.

Among these methods, a low-temperature solution polymerization method is taken as an example, and a method for preparing the polymer is described.

According to the low-temperature solution polymerization method, tetracarboxylic acid anhydride and diamine are reacted in an aprotic polar solvent to provide polyamic acid, and the polyamic acid is imidized, for example through thermal solution imidization chemical imidization.

The aprotic polar solvent may include a sulfoxide-based solvent such as dimethylsulfoxide and diethylsulfoxide, a formamide-based solvent such as N,N-dimethylformamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m-, or p-cresol, xylenol, halogenated phenol, and catechol, hexamethylphosphoramide, γ-butyrolactone, or a mixture thereof.

However, this disclosure is not limited to these solvents, and an aromatic hydrocarbon such as xylene and toluene may be used instead.

Also, to promote the dissolution of the polymer, an alkali metal salt or an alkaline earth metal salt may be further added to the solvent in an amount of about 50 wt % or less based on the total amount of the solvent.

First, polyamic acid, a precursor of the polymer (polyimide), may be prepared using tetracarboxylic acid anhydride selected from a dianhydride represented by the following Chemical Formula 30, 2,2-bis-(3,4-dicarboxylphenyl) hexafluoropropane dianhydride ("6FDA"), 3,3',4,4'-biphenyltetracarboxylic dianhydride ("BPDA"), benzophenone tetracarboxylic dianhydride ("BTDA"), bis(3,4-dicarboxyphenyl)sulfone dianhydride, and a combination thereof; and a diamine selected from 2,2'-bis(trifluoromethyl)benzidine ("TFDB"), 4,4'-diaminodiphenyl sulfone ("DADPS"), 4,4'-(9-fluorenylidene)dianiline ("BAPF"), bis(4-(4-aminophenoxy)phenyl)sulfone ("BAPS"), 2,2',5,5'-tetrachlorobenzidine, 2,7-diaminofluorene, 1,1-bis(4-aminophenyl)cyclohexane, 4,4'-methylenebis-(2-methylcyclohexylamine), 4,4-diaminooctafluorobiphenyl, 3,3'-dihydroxybenzidine, 1,3-cyclohexanediamine, and a combination thereof.

Herein, the kind and amount of the tetracarboxylic acid anhydride and diamine may be selected appropriately according to a desired composition of the polymer.

Chemical Formula 30

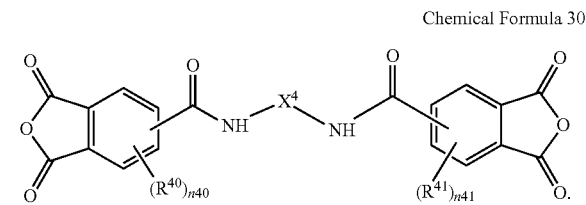

In Chemical Formula 30, $X^4$ is a functional group represented by the following Chemical Formulae 2 to 7, where $R^{40}$ and $R^{41}$ are the same or different and are independently a halogen, a hydroxy group, an ether group (—$OR^{200}$, wherein $R^{200}$ is a C1 to C10 aliphatic organic group), a silyl group (—$SiR^{201}R^{202}R^{203}$, wherein $R^{201}$, $R^{202}$, and $R^{203}$ are the same or different and are independently hydrogen, or a C1 to C10 aliphatic organic group), a substituted or unsubstituted C1 to C10 aliphatic organic group, or a C6 to C20 aromatic organic group, specifically a halogen, or a C1 to C5 alkyl group, and n40 and n41 are independently integers ranging from 0 to 3, and specifically each is 0.

According to another embodiment, an article including the polymer is provided.

The article may be film, a fiber, or a coating material, but is not limited thereto.

The article may be formed of the polymer through a dry-wet method, a dry method, or a wet method, but this disclosure is not limited thereto.

When a film among the articles is manufactured through the dry-wet method, the film is formed by extruding the polymer from a spinner on a supporter such as drum or an endless belt, drying it and evaporating the solvent out of the film until the film is self-maintaining.

The drying may be performed at about 25° C. to about 220° C. for about 1 hour or less.

When the surface of the drum and/or the endless belt used for the drying process is flat, a film with a flat surface is acquired.

The film obtained after the drying process is delaminated from the supporter, and inputted to a wet process for demineralization and/or desolventization, and the manufacturing of the film is completed as it goes through elongation, drying, and/or heat treatment.

The elongation is done to an elongation ratio, which may range from about 0.8 to about 8 in terms of surface ratio. According to an embodiment, it may range from about 1.3 to about 8. Herein, the surface ratio is defined as a value obtained by dividing the area of a film after elongation by an area of the film before elongation.

Herein, a number of 1 or less denotes a relaxed state. According to one embodiment, it may range from about 2 to about 6.

Meanwhile, the elongation may be performed not only in a surface direction but also in a thickness direction.

The heat treatment may be performed at a temperature of about 200° C. to about 500° C., particularly at about 250° C. to about 400° C., for about a few seconds to a few minutes.

Also, the film after elongation and heat treatment may be cooled slowly, particularly at a speed of about 50° C./second or lower.

The film may be formed as a single layer or as multiple layers.

An article including the polymer may have total light transmittance of greater than or equal to about 80% in a wavelength range of about 380 nm to about 780 nm, and may have light transmittance of greater than or equal to about 70% at about a 400 nm wavelength.

When the article has light transmittance within the above range, the article may have excellent color reproducibility.

In an embodiment, the article may have total light transmittance of about 80% to about 95% in a wavelength range of about 380 nm to about 780 nm, and may have light transmittance of about 70% to about 90% at a wavelength of about 400 nm.

The article may have haze of less than or equal to about 5%.

When the haze of the article is within the range, the article may be transparent enough to have excellent clarity.

In an embodiment, the article may have haze of less than or equal to about 3%, and more specifically less than or equal to about 1.5%.

The article may have a yellow index ("YI") of less than or equal to 5.

When the yellow index ("YI") of the article is within the range, the article may be transparent and colorless.

In an embodiment, the article may have a yellow index ("YI") of about 0.5 to about 3.

The article, for example a film, may have a thickness of about 0.01 micrometers ("μm") to about 1,000 μm, specifically from about 0.1 μm to about 1,000 μm, more specifically from about 1 μm to about 1,000 μm, but the disclosure is not limited to this and the thickness may be adjusted properly according to the usage.

The article may have a coefficient of thermal expansion ("CTE") of less than or equal to about 35 parts per million per degree Celsius ("ppm/° C.").

When the coefficient of thermal expansion of the article is within the range, the article may have excellent heat resistance.

In an embodiment, the article may have a coefficient of thermal expansion of less than or equal to about 25 parts per million per degree Celsius ("ppm/° C."), and specifically less than or equal to about 15 ppm/° C.

Since the article includes the polymer which has excellent transparency, heat resistance, mechanical strength, and flexibility, the article may have excellent transparency, heat resistance, mechanical strength, and flexibility as well.

Therefore, the article may be used for diverse areas, such as a substrate for a device, a substrate for a display device, an optical film, an integrated circuit ("IC") package, a multi-layer flexible printed circuit ("FRC"), a tape, a touch panel, and a protective film for an optical disk.

Another embodiment provides a display device including the article.

Particularly, the display device may include a liquid crystal display ("LCD"), an organic light emitting diode ("OLED"), and the like, but is not limited thereto.

Among the display devices, a liquid crystal display ("LCD") is described by referring to FIG. 1.

FIG. 1 is a cross-sectional view of a liquid crystal display ("LCD") in accordance with an embodiment.

Referring to FIG. 1, the liquid crystal display ("LCD") includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173, and a drain electrode 175 are sequentially disposed on a substrate 110.

The source electrode 173 and the drain electrode 175 are isolated from each other and face each other with the gate electrode 124 between them.

One gate electrode 124, one source electrode 173, and one drain electrode 175 constitute one thin film transistor ("TFT") together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180.

The pixel electrode 191 is connected to the drain electrode 175 through the contact hole 185.

The common electrode panel 200 will now be described.

In the common electrode panel 200, a light blocking member 220 referred to as a black matrix is disposed on a substrate 210, a color filter 230 is disposed on the substrate 210 and the light blocking member 220, and a common electrode 270 is formed on the color filter 230.

Herein, the substrates 110 and 210 may each be an article prepared by using the polymer.

Figure 2:
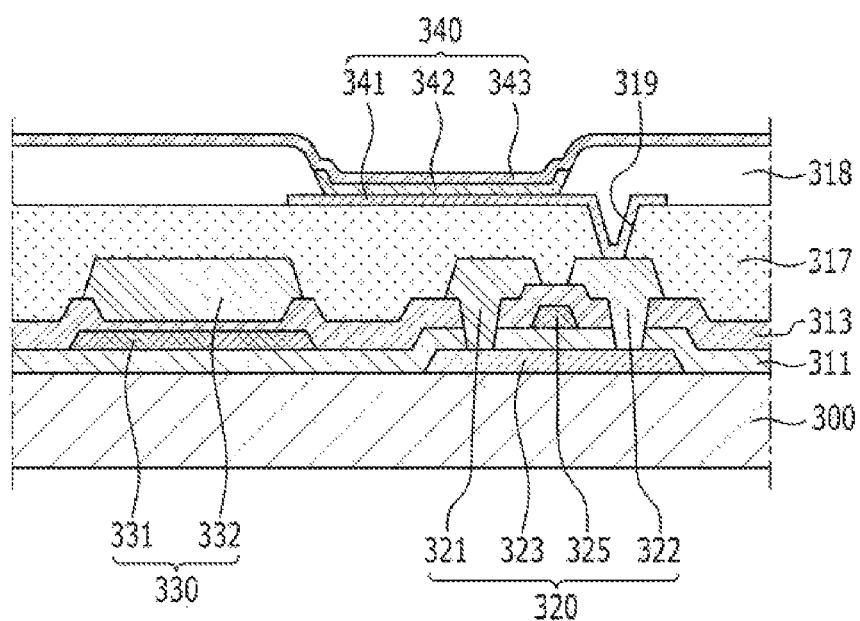
FIG. 2 is a cross-sectional view of an organic light emitting diode ("OLED") according to an embodiment.

Meanwhile, among the display devices, an organic light emitting diode ("OLED") is described by referring to FIG. 2.

FIG. 2 is a cross-sectional view of an organic light emitting diode ("OLED") in accordance with an embodiment.

Referring to FIG. 2, a thin film transistor 320, a capacitor 330, and an organic light emitting diode 340 are formed on a substrate 300.

The thin film transistor 320 includes a source electrode 321, a semiconductor layer 323, a gate electrode 325, and a drain electrode 322, and the capacitor 330 includes a first capacitor 331 and a second capacitor 332. The organic light emitting diode 340 includes a pixel electrode 341, an intermediate layer 342, and an opposed electrode 343.

According to an embodiment of this disclosure, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300.

The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as indium-tin oxide ("ITO") or indium-zinc oxide ("IZO") is disposed on the planarization layer 317.

The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed into an article prepared by using the polymer.

Example

Hereafter, embodiments of this disclosure are described in detail with reference to examples and comparative examples. The following examples and comparative examples are not restrictive but are illustrative.

Synthesis Example 1

Material Synthesis for Optical Film (Dianhydride)

Dianhydride DA48 is synthesized according to the following method, and is represented by the following Chemical Formula 40.

Chemical Formula 40

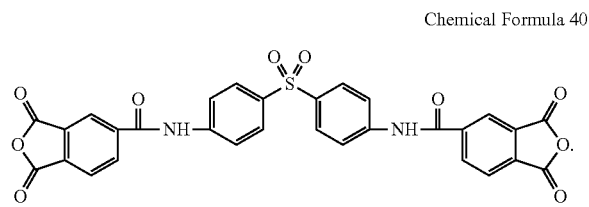 [SMILES: O=C(Nc1ccc(S(=O)(=O)c2ccc(NC(=O)c3ccc4c(c3)C(=O)OC4=O)cc2)cc1)c1ccc2c(c1)C(=O)OC2=O]

First, 24.83 g of 4,4'-diamino diphenyl sulfone ("DADPS") (mw 248.31 g/mol; v 0.1 mol) and 17.4 g of pyridine (mw 79.1 g/mol; v 0.22 mol) are mixed in 200 mL of dry acetone, and the solution is filled in a funnel.

On the other hand, 44.22 g of trimellitic anhydride (mw 210.57 g/mol; v 0.21 mol) is added to 200 ml of dry acetone and dissolved therewith in a 1 L 2-necked round-bottomed flask.

While the solution is refluxed under a nitrogen atmosphere, the DADPS and pyridine solution is slowly added thereto for 15 minutes.

The resulting solution is additionally refluxed for 30 minutes and cooled down to room temperature.

Next, a yellow precipitate is filtered, washed with dry acetone, and then washed and dried.

Then, the unpurified product is crystallized with acetic anhydride, and the crystallized product is washed with acetone and dried at 130° C. for 24 hours.

51.3 g (mw 596.53 g/mol; v 0.073 mol; 86%) of a resulting material is obtained.

$^1$H NMR 300 MHz (DMSO-$d_6$, δ, ppm): 7.97-8.07 (m, 8H), 8.23 (d, $J_{1,2}$=8 Hz, 2H), 8.49 (dd, $J_{1,2}$=8 Hz, $J_{1,3}$=1.4 Hz, 2H), 8.60 (d, $J_{1,3}$=1.4 Hz, 2H), 11.03 (s, 2H, NH).

$^{13}$C NMR 300 MHz (DMSO-$d_6$, δ, ppm): 121.0, 124.7, 128.9, 132.1, 134.3, 136.2, 136.7, 141.4, 143.6, 163.1, 163.2, 164.4.

IR (v, cm$^{-1}$): 685, 718, 831, 897, 934, 1105, 1146, 1254, 1321, 1400, 1528, 1589, 1674, 1768, 1850, 2029, 2162, 3067, 3368.

Figure 3:
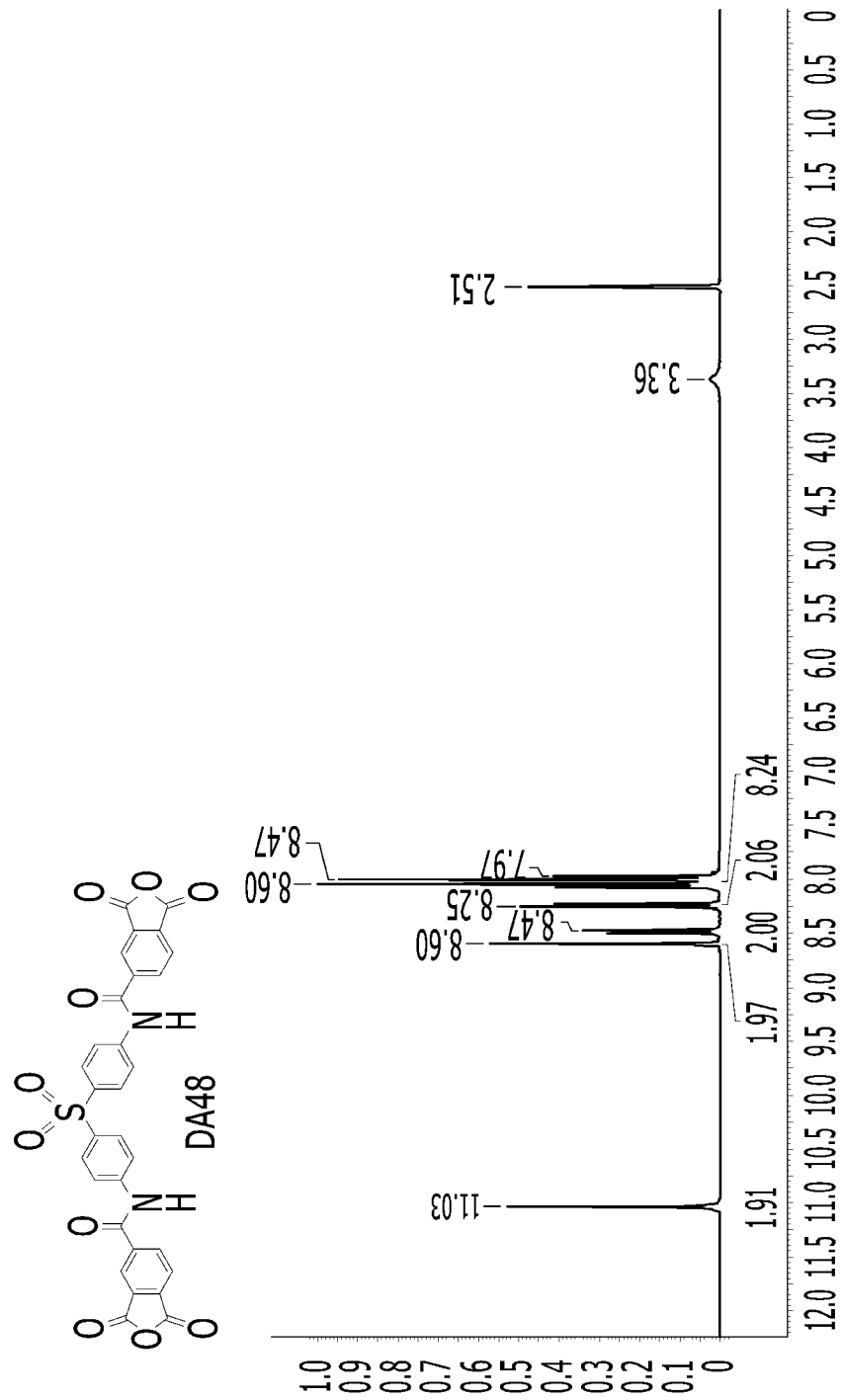
FIG. 3 shows a $^1$H NMR graph of a product of Synthesis Example 1.

FIG. 3 shows a $^1$H NMR graph of the resulting material.

Synthesis Example 2

Material Synthesis for Optical Film (Dianhydride)

Dianhydride DA96 is synthesized according to the following Chemical Formula 41.

Chemical Formula 41

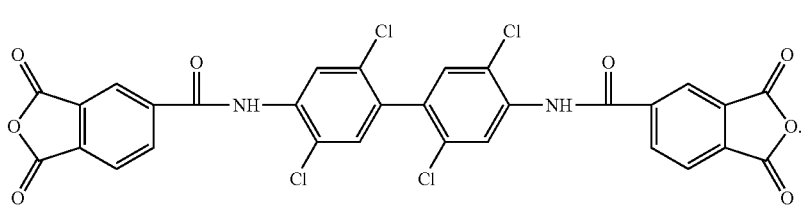

First, 32.20 g of 2,2',5,5' tetrachlorobenzidine (mw 322.02 g/mol; v 0.1 mol) and 17.4 g of pyridine (mw 79.1 g/mol; v 0.22 mol) are mixed with 300 mL of dry acetone, and the solution is filled in a funnel.

On the other hand, 44.22 g of trimellitic anhydride (mw 210.57 g/mol; v 0.21 mol) is dissolved in 200 ml of dry acetone in a 1 L 2-necked round-bottomed flask.

While this solution is refluxed under a nitrogen atmosphere, the tetrachlorobenzidine and pyridine solution is slowly added thereto for 15 minutes.

The mixture is additionally refluxed for 30 minutes and cooled down to room temperature.

Next, a yellowish white (off-white) solid precipitate is filtered, washed with acetone, and dried, and then crystallized with acetic anhydride.

The crystallized product is dried at 130° C. for 24 hours, obtaining a yellowish white solid product.

The resulting material is 48.9 g (mw 670.25 g/mol; v 0.073 mol; 73%).

$^1$H NMR 300 MHz (DMSO-$d_6$, δ, ppm): 7.8 (s, 2H), 7.98 (s, 2H), 8.28 (d, $J_{1,2}$=8 Hz, 2H), 8.53 (dd, $J_{1,2}$=8 Hz, J1,3=1.5 Hz, 2H), 8.62 (d, J1,3=1.5 Hz, 2H), 10.8 (s, 2H, NH).

$^{13}$C NMR 300 MHz (DMSO-d$_6$, δ, ppm): 124.6, 126.1, 128.5, 129.0, 131.6, 132.3, 132.4, 134.4, 135.8, 136.1, 136.3, 140.8, 163.1, 163.2, 164.2.

IR (ν, cm$^{-1}$): 716, 893, 941, 1057, 1088, 1238, 1352, 1510, 1562, 1657, 1771, 1856, 2010, 2162, 3107, 3273.

Figure 4:
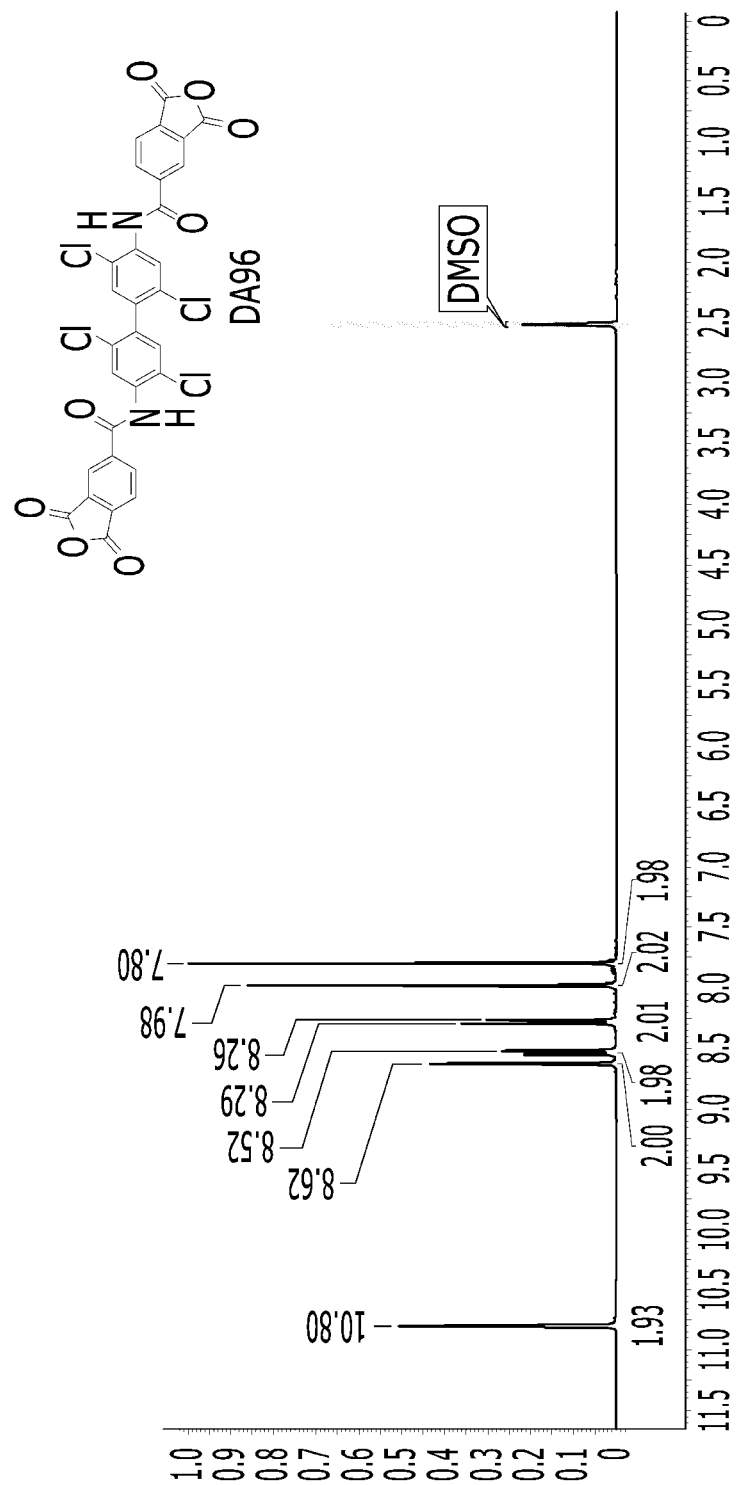
FIG. 4 shows a $^1$H NMR graph of a product of Synthesis Example 2.

FIG. 4 shows a $^1$H NMR graph of the resulting material.

Synthesis Example 3

Material Synthesis for Optical Film (Dianhydride)

Dianhydride DA73 is synthesized according to the following Chemical Formula 42.

Chemical Formula 42

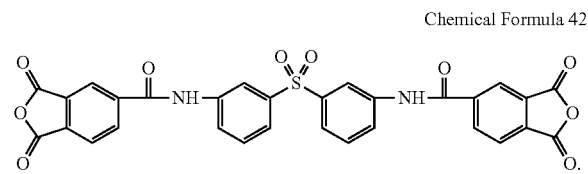 [SMILES: O=C(Nc1cccc(S(=O)(=O)c2cccc(NC(=O)c3ccc4c(c3)C(=O)OC4=O)c2)c1)c1ccc2c(c1)C(=O)OC2=O]

First, 24.83 g of 3,3' diamino diphenyl sulfone ("DADPS") (mw 248.31 g/mol; v 0.1 mol) and 17.4 g of pyridine (mw 79.1 g/mol; v 0.22 mol) are mixed in 200 mL of dry acetone, and the solution is filled in a funnel for addition in a dropwise fashion.

On the other hand, 44.22 g of trimellitic anhydride (mw 210.57 g/mol; v 0.21 mol) is dissolved in 200 ml of dry acetone in a 1 L 2-necked round-bottomed flask.

While this solution is refluxed under a nitrogen atmosphere, the aforementioned DADPS and pyridine solution is slowly added thereto for 15 minutes.

The resulting solution is additionally refluxed for 30 minutes and cooled down to room temperature.

Then, water is added to the yellow solution, obtaining a precipitate.

The solid precipitate is ground, washed with water, and dried at 110° C. for 24 hours.

The unpurified product is crystallized with acetic anhydride, filtered, and washed with dry acetone.

The product is dried at 130° C. for 24 hours, obtaining a bright yellow solid.

The resulting material is 48.9 g (mw 596.53 g/mol; v 0.082 mol; 82%).

$^1$H NMR 300 MHz (DMSO-d$_6$, δ, ppm): 7.66-7.76 (m, 4H), 8.13 (d, J$_{1,2}$=7.8 Hz, 2H), 8.24 (d, J$_{1,2}$=7.8 Hz, 2H), 8.50 (m, 2H), 8.62 (s, 2H), 11.01 (s, 2H, NH).

$^{13}$C NMR 300 MHz (DMSO-d$_6$, δ, ppm): 119.0, 123.3, 124.6, 125.5, 126.0, 131.0, 132.2, 134.3, 136.1, 140.2, 141.4, 141.9, 163.1, 163.2, 164.2.

IR (ν, cm$^{-1}$): 685, 716, 801, 881, 904, 934, 1101, 1148, 1238, 1298, 1412, 1476, 1533, 1591, 1676, 1769, 1852, 2023, 2162, 3071, 3370.

Figure 5:
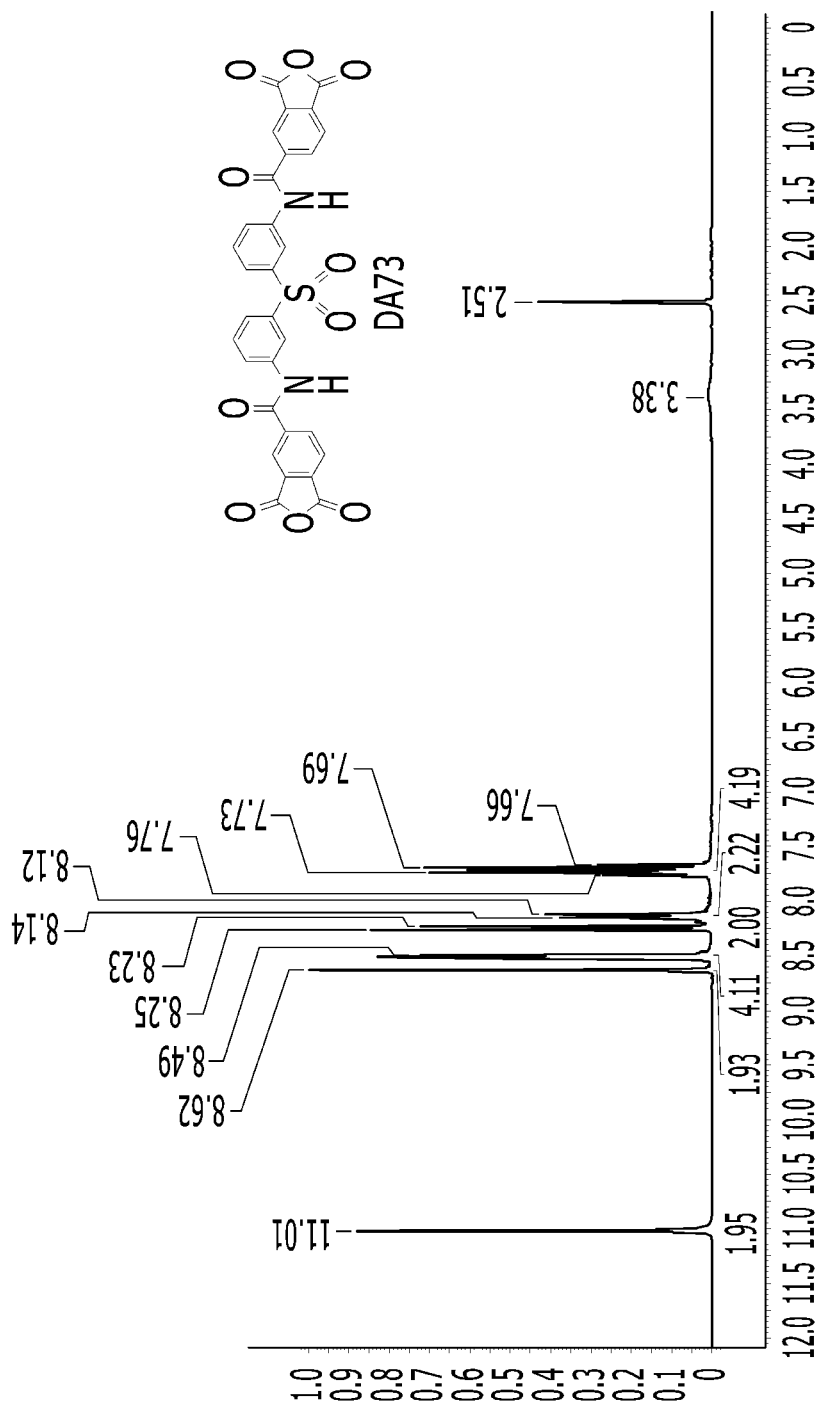
FIG. 5 shows a $^1$H NMR graph of a product of Synthesis Example 3.

FIG. 5 shows a $^1$H NMR graph of the resulting material.

Example 1

Preparation of Polymer and Film 0.5 mol of the dianhydride according to Synthesis Example 1 and 0.5 mol of 2,2'-bis(trifluoromethyl)benzidine ("TFDB") are reacted in N,N-dimethyl acetamide ("DMAC") at 5° C. for 1 hour in a 500 mL round-bottomed flask, and 1 mol of acetic anhydride and 1 mol of pyridine are added thereto. The mixture is agitated for chemical imidization at 25° C. for 12 hours, obtaining polyimide.

The polyimide has a weight average molecular weight ("Mw") of 193,000 g/mol.

The polyimide is coated on a glass substrate and respectively dried at 65° C., 70° C., and 75° C. for 20 minutes and respectively dried at 80° C. and 130° C. for 30 minutes, forming a film.

The film is annealed under a nitrogen atmosphere at 320° C. for 7 minutes.

The film is 15 μm thick.

Example 2

Preparation of Polymer and Film

A polymer and a film are prepared according to the same method as Example 1, except for using 0.5 mol of the dianhydride according to Example 2 instead of 0.5 mol of the dianhydride according to Synthesis Example 1.

The polyimide has a weight average molecular weight ("Mw") of 210,000 g/mol. The film is 9 μm thick.

Example 3

Preparation of Polymer and Film

A polymer and a film are prepared according to the same method as Example 1, except for using 0.125 mol of the dianhydride according to Synthesis Example 2 and 0.375 mol of 2,2-bis(3,4-dicarboxylphenyl)hexafluoropropane dianhydride ("6FDA") instead of 0.5 mol of the dianhydride according to Synthesis Example 1.

The polyimide has a weight average molecular weight ("Mw") of 165,000 g/mol. The film is 8 μm thick.

Example 4

Preparation of Polymer and Film

A polymer and a film are prepared according to same method as Example 1, except for using 0.125 mol of the dianhydride according to Synthesis Example 3 and 0.375 mol of 2,2-bis(3,4-dicarboxylphenyl)hexafluoropropane dianhydride ("6FDA") instead of 0.5 mol of the dianhydride according to Synthesis Example 1.

The polyimide has a weight average molecular weight ("Mw") of 182,000 g/mol. The film is 8 μm thick.

Experimental Example 1

Optical Properties

The light transmittance, haze, and yellow index ("Mw") of the films prepared according to Examples 1 to 4 are measured with a KONICA MINOLTA spectrophotometer to evaluate the optical properties of the films prepared according to Examples 1 to 4. The results are presented in the following Table 4.

TABLE 1

|  | Total light transmittance (%, 380 nm to 780 nm) | Light transmittance (%, 400 nm) | Haze (%) | Yellow index |
| --- | --- | --- | --- | --- |
| Example 1 | 87.18 | — | 0.48 | — |
| Example 2 | 86.09 | — | 1.1 | 4.13 |

TABLE 1-continued

|  | Total light transmittance (%, 380 nm to 780 nm) | Light transmittance (%, 400 nm) | Haze (%) | Yellow index |
|---|---|---|---|---|
| Example 3 | 89.65 | 79.35 | 0.44 | 1.22 |
| Example 4 | 89.86 | 85.21 | 0.38 | 1.02 |

Referring to Table 1, the films according to Examples 1 to 4 have excellent total light transmittance and haze characteristics at a wavelength range of about 380 nm to about 780 nm.

The film according to Example 2 also has an excellent yellow index characteristic, and the films according to Examples 3 and 4 also have good light transmittance and yellow index at a wavelength of about 400 nm.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer comprising a repeating unit represented by Chemical Formula 20 and a repeating unit represented by Chemical Formula 21:

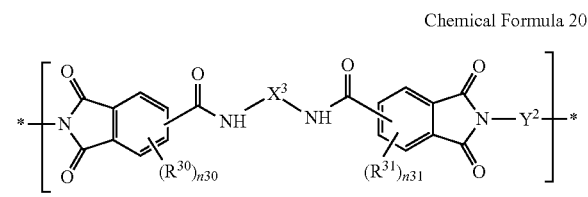

Chemical Formula 20 wherein, in Chemical Formula 20, $X^3$ is the same or different in each repeating unit and is independently a functional group represented by Chemical Formulae 2 to 7, $Y^2$ is the same or different in each repeating unit and independently includes a C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{30}$ and $R^{31}$ are the same or different and are independently a halogen, a hydroxy group, an alkoxy group (—OR$^{216}$, wherein R$^{216}$ is a C1 to C10 aliphatic organic group), a silyl group (—SiR$^{217}$R$^{218}$R$^{219}$, wherein R$^{217}$, R$^{218}$, and R$^{219}$ are the same or different and are independently hydrogen, or a C1 to C10 aliphatic organic group), a C1 to C10 aliphatic organic group, or a C6 to C20 aromatic organic group, and n30 and n31 are independently integers ranging from 0 to 3,

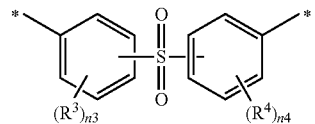

Chemical Formula 2

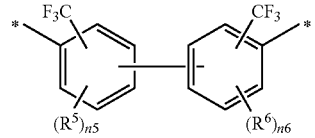

Chemical Formula 3

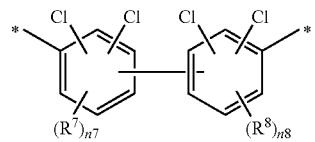

Chemical Formula 4

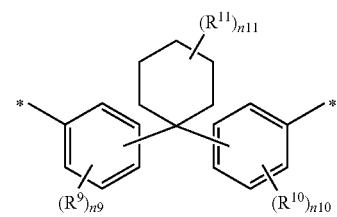

Chemical Formula 5

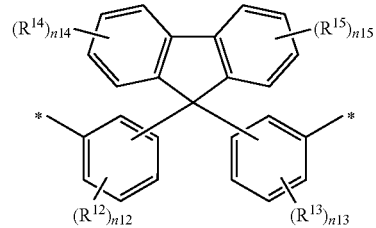

Chemical Formula 6

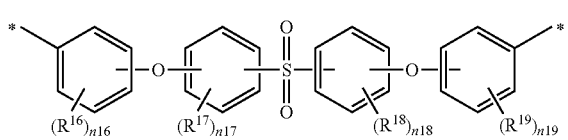

Chemical Formula 7 wherein in Chemical Formulae 2 to 7, $R^3$ to $R^{19}$ are the same or different and are independently a halogen, a hydroxy group, an alkoxy group (—OR$^{220}$, wherein R$^{220}$ is a C1 to C10 aliphatic organic group), a silyl group (—SiR$^{221}$R$^{222}$R$^{223}$, wherein R$^{221}$, R$^{222}$, R$^{223}$ are the same or different and are independently hydrogen, or a C1 to C10 aliphatic organic group), a C1 to C10 aliphatic organic group, or a C6 to C20 aromatic organic group, n3, n4, n9, n10, n12, n13, n14, n15, n16, n17, n18, and n19 are each independently integers ranging from 0 to 4, n5 and n6 are each independently integers ranging from 0 to 3, n7 and n8 are each independently integers ranging from 0 to 2, and n11 is an integer ranging from 0 to 10, Chemical Formula 21

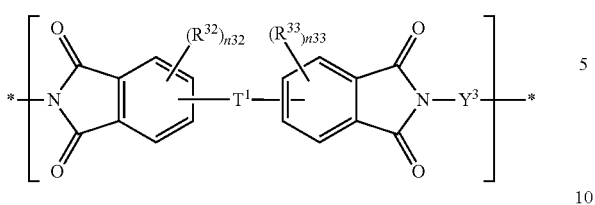

wherein, in Chemical Formula 21, $T^1$ is the same or different in each repeating unit and is independently a single bond, a C1 to C30 aliphatic organic group, a C3 to C30 alicyclic organic group, a C6 to C30 aromatic organic group, or a C2 to C30 heterocyclic group, $Y^3$ is the same or different in each repeating unit and independently includes a C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, $R^{32}$ and $R^{33}$ are the same or different and are independently a halogen, a hydroxy group, an alkoxy group (—OR$^{224}$, wherein R$^{224}$ is a C1 to C10 aliphatic organic group), a silyl group (—SiR$^{225}$R$^{226}$R$^{227}$, wherein R$^{225}$, R$^{226}$, and R$^{227}$ are the same or different and are independently hydrogen, or a C1 to C10 aliphatic organic group), a C1 to C10 aliphatic organic group, or a C6 to C20 aromatic organic group, and n32 and n33 are independently integers ranging from 0 to 3.

2. The polymer of claim 1, wherein in Chemical Formula 20, $X^3$ is represented by Chemical Formulae:

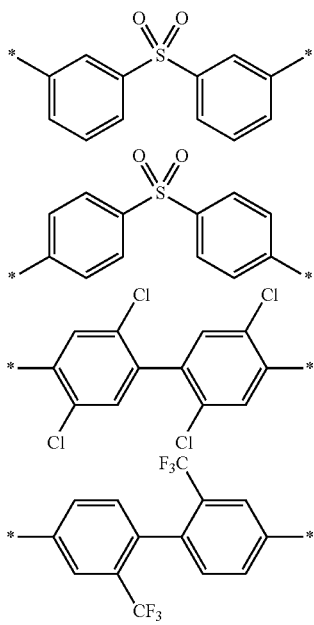

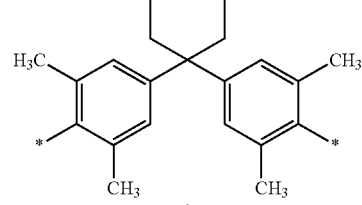

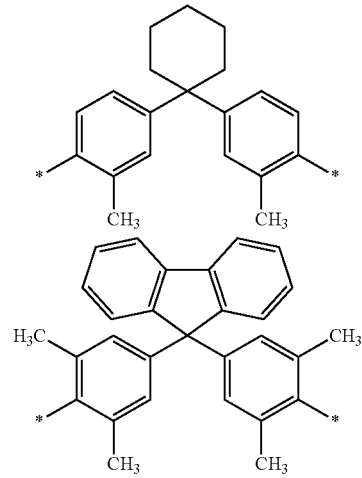

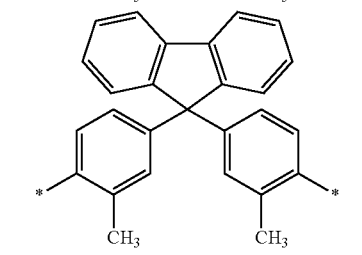

3. A polymer comprising:

a repeating unit represented by Chemical Formula 20 and a repeating unit represented by Chemical Formula 22, a repeating unit represented by Chemical Formula 23, or a combination thereof:

Chemical Formula 20

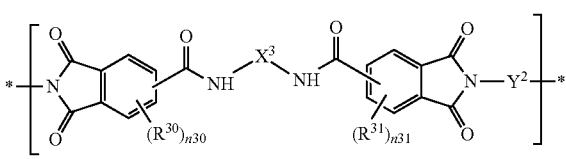

wherein, in Chemical Formula 20,

X³ is the same or different in each repeating unit and is independently a functional group represented by Chemical Formulae 2 to 7, Y² is the same or different in each repeating unit and independently includes a C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, R³⁰ and R³¹ are the same or different and are independently a halogen, a hydroxy group, an alkoxy group (—OR²¹⁶, wherein R²¹⁶ is a C1 to C10 aliphatic organic group), a silyl group (—SiR²¹⁷R²¹⁸R²¹⁹, wherein R²¹⁷, R²¹⁸, and R²¹⁹ are the same or different and are independently hydrogen, or a C1 to C10 aliphatic organic group), a C1 to C10 aliphatic organic group, or a C6 to C20 aromatic organic group, and n30 and n31 are independently integers ranging from 0 to 3,

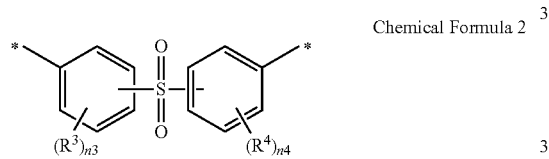
Chemical Formula 2

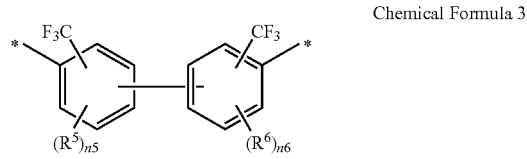
Chemical Formula 3

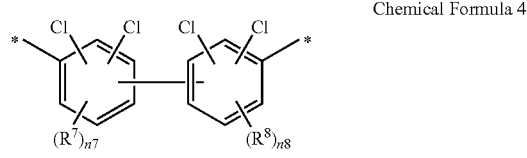
Chemical Formula 4

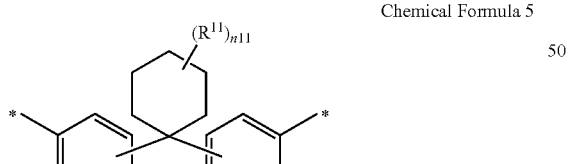
Chemical Formula 5

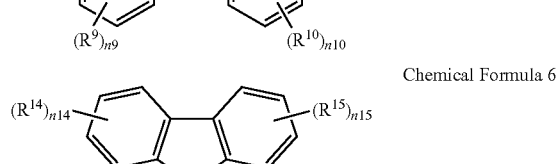
Chemical Formula 6

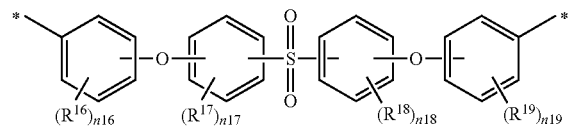
Chemical Formula 7 wherein in Chemical Formulae 2 to 7,

R³ to R¹⁹ are the same or different and are independently a halogen, a hydroxy group, an alkoxy group (—OR²²⁰, wherein R²²⁰ is a C1 to C10 aliphatic organic group), a silyl group (—SiR²²¹R²²²R²²³, wherein R²²¹, R²²², R²²³ are the same or different and are independently hydrogen, or a C1 to C10 aliphatic organic group), a C1 to C10 aliphatic organic group, or a C6 to C20 aromatic organic group, n3, n4, n9, n10, n12, n13, n14, n15, n16, n17, n18, and n19 are each independently integers ranging from 0 to 4, n5 and n6 are each independently integers ranging from 0 to 3, n7 and n8 are each independently integers ranging from 0 to 2, and n11 is an integer ranging from 0 to 10,

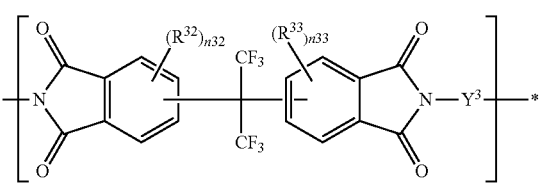
Chemical Formula 22

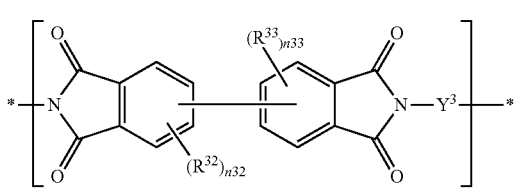
Chemical Formula 23 wherein, in Chemical Formulae 22 and 23,

Y³ is the same or different in each repeating unit and independently includes a C6 to C30 aromatic organic group, wherein the aromatic organic group is present singularly; two or more aromatic groups are linked to each other to provide a condensed ring system; and two or more aromatic groups are linked to each other through a single bond, a fluorenyl group, —O—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—, R³² and R³³ are the same or different and are independently a halogen, a hydroxy group, an alkoxy group (—OR²²⁴, wherein R²²⁴ is a C1 to C10 aliphatic organic group), a silyl group (—SiR²²⁵R²²⁶R²²⁷, wherein R²²⁵, R²²⁶, and R²²⁷ are the same or different and are independently hydrogen, or a C1 to C10 aliphatic organic group), a C1 to C10 aliphatic organic group, or a C6 to C20 aromatic organic group, and n32 and n33 are independently integers ranging from 0 to 3.

4. A polymer comprising:
a repeating unit represented by Chemical Formulae 20-1 to 20-10, or a combination thereof, and
a repeating unit represented by Chemical Formula 21-1, Chemical Formula 21-2, or a combination thereof.

Chemical Formula 20-1

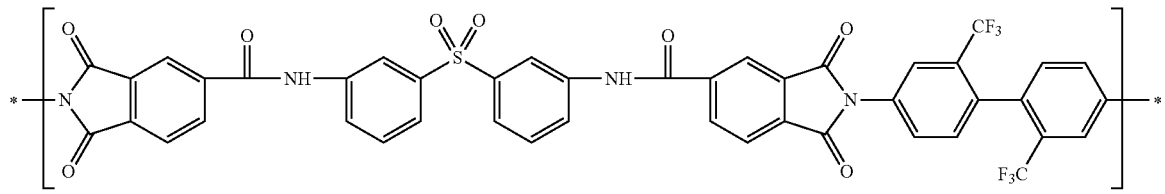

Chemical Formula 20-2

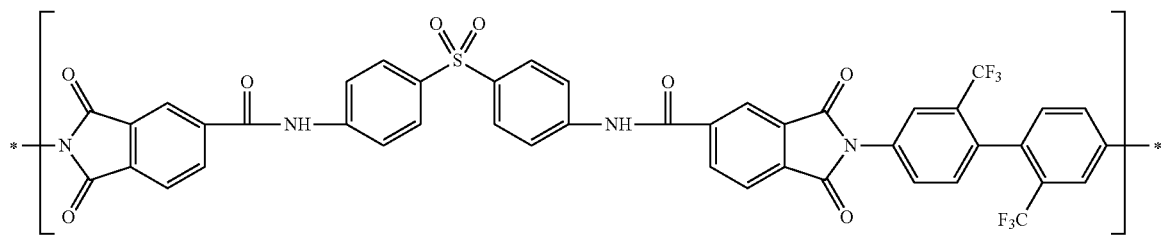

Chemical Formula 20-3

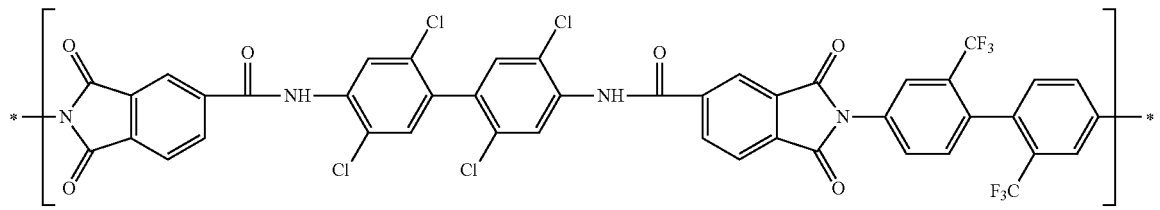

Chemical 20-4

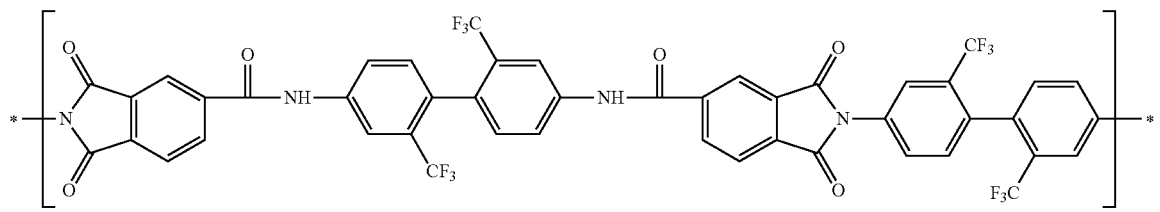

Chemical Formula 20-5

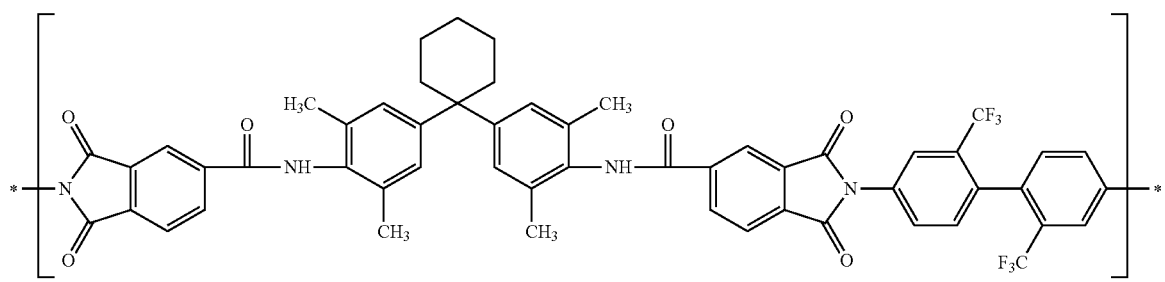

-continued
Chemical Formula 20-6
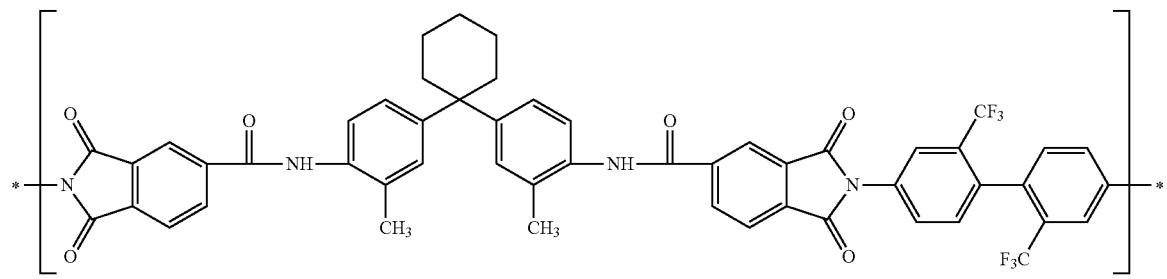
Chemical Formula 20-7
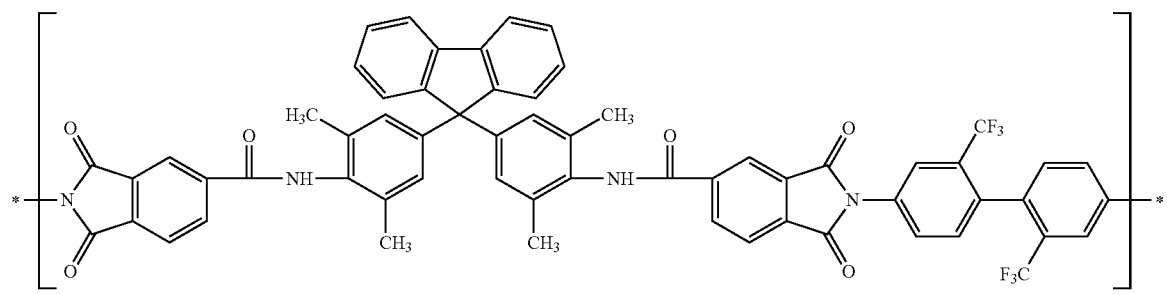
Chemical Formula 20-8
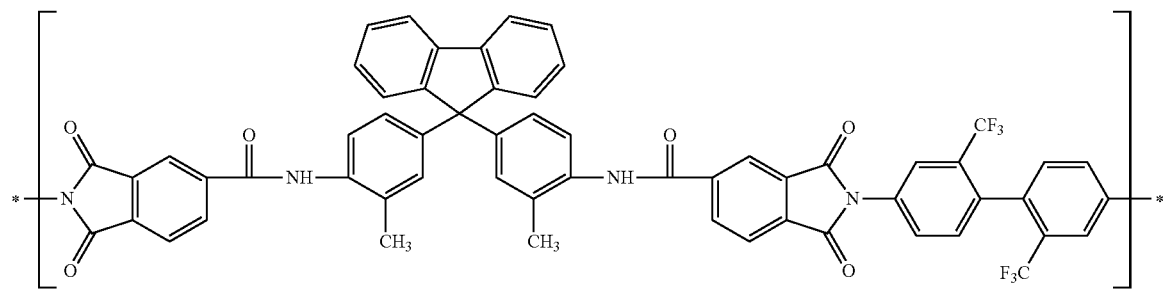
Chemical Formula 20-9
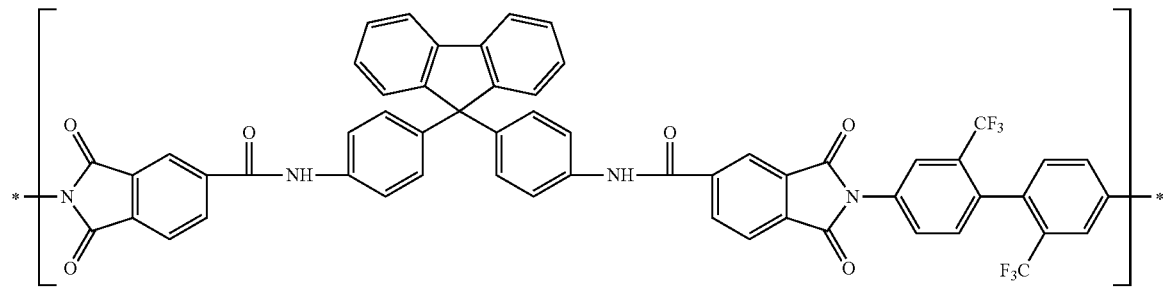
Chemical Formula 20-10
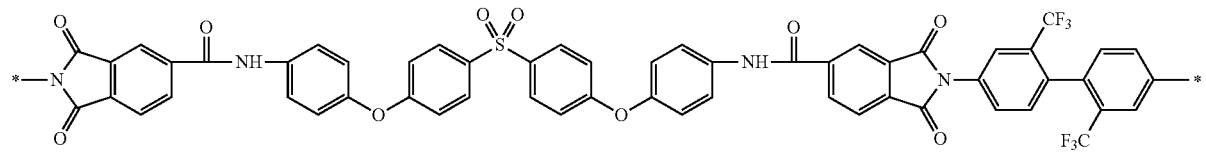
Chemical Formula 21-1
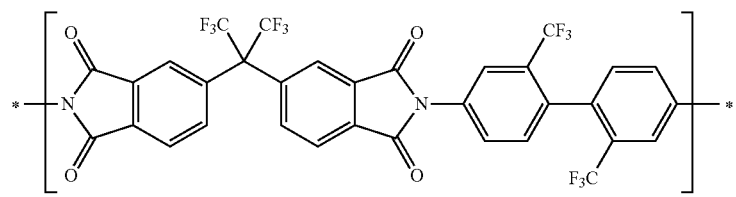

-continued

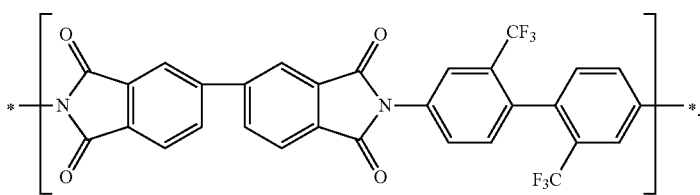

Chemical Formula 21-2

5. The polymer of claim 1, wherein a mole ratio of the repeating unit represented by Chemical Formula 20 and the repeating unit represented by Chemical Formula 21 is about 5:95 to about 95:5.

6. The polymer of claim 1, wherein the polymer has a weight average molecular weight of about 10,000 g/mol to about 500,000 g/mol.

7. An article comprising the polymer of claim 1.

8. The article of claim 7, wherein the article is a film, a fiber, or a coating material.

9. The article of claim 7, wherein the article has total light transmittance of greater than or equal to about 80% in a wavelength range of about 380 nanometers to about 780 nanometers.

10. The article of claim 7, wherein the article has light transmittance of greater than or equal to about 70% at a wavelength of 400 nanometers.

11. The article of claim 7, wherein the article has haze of less than or equal to about 5%.

12. The article of claim 7, wherein the article has a yellow index of less than or equal to 5.

13. A display device comprising the article according to claim 7.

14. The display device of claim 13, wherein the article has total light transmittance of greater than or equal to about 80% in a wavelength range of about 380 nanometers to about 780 nanometers.

* * * * *